US009826464B2

(12) United States Patent
Visuri et al.

(10) Patent No.: US 9,826,464 B2
(45) Date of Patent: Nov. 21, 2017

(54) SYSTEMS AND METHODS FOR ESTABLISHING WIRELESS CONNECTIONS BASED ON ACCESS CONDITIONS

(71) Applicant: BandwidthX Inc., Carlsbad, CA (US)

(72) Inventors: Pertti Juhani Visuri, Fallbrook, CA (US); Randy Salo, San Diego, CA (US); Christian Van Hamersveld, San Diego, CA (US); Dan Zagursky, San Diego, CA (US); Brian Moses, Carlsbad, CA (US); Johanna Katariina Visuri, Solana Beach, CA (US)

(73) Assignee: BandwidthX Inc., Carlsbad, CA (US)

( * ) Notice: Subject to any disclaimer, the term of this patent is extended or adjusted under 35 U.S.C. 154(b) by 175 days.

(21) Appl. No.: 14/225,310

(22) Filed: Mar. 25, 2014

(65) Prior Publication Data

US 2014/0293829 A1 Oct. 2, 2014

Related U.S. Application Data

(60) Provisional application No. 61/805,473, filed on Mar. 26, 2013.

(51) Int. Cl.
H04L 12/28 (2006.01)
H04W 48/14 (2009.01)
(Continued)

(52) U.S. Cl.
CPC .......... *H04W 48/14* (2013.01); *H04L 12/145* (2013.01); *H04M 15/8351* (2013.01);
(Continued)

(58) Field of Classification Search
CPC .................................................. H04L 12/145
See application file for complete search history.

(56) References Cited

U.S. PATENT DOCUMENTS 7,003,311 B2 2/2006 Ebata et al.
7,505,795 B1 3/2009 Lim
(Continued)

FOREIGN PATENT DOCUMENTS

CN 101616463 A 12/2009
EP 1926283 A1 5/2008
(Continued)

OTHER PUBLICATIONS

International Search Report and Written Opinion for related international application No. PCT/US2012/066389, dated Mar. 18, 2013, in 9 pages.
(Continued)

Primary Examiner — Huy D Vu
Assistant Examiner — Kevin Cunningham
(74) Attorney, Agent, or Firm — Procopio, Cory, Hargreaves & Savitch LLP; Jonathan Cheng

(57) ABSTRACT

The subject matter described herein includes managing access conditions and determining which access point to use by a wireless device based on terms and conditions (TCs) for allowing access (TCsAA) and terms and conditions for utilizing access (TCsUA) provided and updated by various parties in a system for alternative network access provision (ANAPS) comprising of a cloud based server system and a wireless device and its connection manager software system. The TCs may depend on a number of variables including one or more of the following: price, availability, relative signal strengths and communication speeds of different cellular base pay and or access points and connections through the stations or access points to the Internet or other backend systems, the location and possible motion of the device, the time of day, week, month or year as well as the cost of communication alternatives.

25 Claims, 18 Drawing Sheets

(51) Int. Cl.
  *H04M 15/00* (2006.01)
  *H04W 64/00* (2009.01)
  *H04W 76/02* (2009.01)
  *H04L 12/14* (2006.01)

(52) U.S. Cl.
  CPC ......... *H04W 64/003* (2013.01); *H04W 76/02* (2013.01); *H04M 15/8044* (2013.01); *H04M 15/8055* (2013.01); *H04W 64/00* (2013.01)

(56) References Cited

U.S. PATENT DOCUMENTS

| | | | |
|---|---|---|---|
| 7,808,960 | B1 | 10/2010 | Chan et al. |
| 8,036,367 | B2 | 10/2011 | Baluja et al. |
| 8,116,285 | B1 | 2/2012 | Barnum |
| 8,494,559 | B1 | 7/2013 | Malmi |
| 9,084,179 | B2 | 7/2015 | Visuri et al. |
| 2002/0181417 | A1 | 12/2002 | Malhotra |
| 2003/0003868 | A1 | 1/2003 | Juurikko |
| 2003/0179135 | A1 | 9/2003 | Louhi |
| 2003/0182556 | A1 | 9/2003 | Sunder et al. |
| 2003/0232615 | A1 | 12/2003 | Kim et al. |
| 2004/0202141 | A1 | 10/2004 | Sinivaara et al. |
| 2004/0224665 | A1 | 11/2004 | Kokubo |
| 2004/0255008 | A1 | 12/2004 | Olsen |
| 2005/0055371 | A1 | 3/2005 | Sunder |
| 2005/0153692 | A1 | 7/2005 | Hwang |
| 2005/0255865 | A1* | 11/2005 | Sillasto et al. ............. 455/456.5 |
| 2005/0271021 | A1 | 12/2005 | Alemany et al. |
| 2006/0002342 | A1 | 1/2006 | Lin |
| 2006/0072493 | A1 | 4/2006 | Ginzburg et al. |
| 2006/0166669 | A1 | 7/2006 | Claussen |
| 2007/0140157 | A1 | 6/2007 | Fu et al. |
| 2007/0165593 | A1 | 7/2007 | Hundal et al. |
| 2007/0185804 | A1 | 8/2007 | Cordoba |
| 2007/0213101 | A1 | 9/2007 | Oh |
| 2007/0249291 | A1 | 10/2007 | Nanda |
| 2008/0057956 | A1 | 3/2008 | Black et al. |
| 2008/0075051 | A1 | 3/2008 | Dundar et al. |
| 2008/0137622 | A1* | 6/2008 | Russell ................... H04L 63/08 370/338 |
| 2008/0176571 | A1* | 7/2008 | Choi ..................... H04W 36/26 455/436 |
| 2008/0293404 | A1 | 11/2008 | Scherzer et al. |
| 2009/0003242 | A1 | 1/2009 | Tinnakornsrisuphap et al. |
| 2009/0028120 | A1* | 1/2009 | Lee ....................... H04W 48/16 370/338 |
| 2009/0098869 | A1 | 4/2009 | Torrance et al. |
| 2009/0203352 | A1 | 8/2009 | Fordon |
| 2009/0239574 | A1 | 9/2009 | Hussain |
| 2010/0085938 | A1 | 4/2010 | Chen et al. |
| 2010/0091669 | A1 | 4/2010 | Liu et al. |
| 2010/0177673 | A1 | 7/2010 | Yoon |
| 2010/0202323 | A1* | 8/2010 | Nishida ............. H04W 36/0016 370/254 |
| 2010/0226299 | A1 | 9/2010 | Sumida |
| 2010/0240352 | A1 | 9/2010 | Suri et al. |
| 2010/0296441 | A1 | 11/2010 | Barkan |
| 2011/0088080 | A1 | 4/2011 | Stupar et al. |
| 2011/0096660 | A1* | 4/2011 | Ikeda ................... H04W 36/36 370/225 |
| 2011/0111708 | A1 | 5/2011 | Tu et al. |
| 2011/0158143 | A1 | 6/2011 | Yun et al. |
| 2011/0171909 | A1 | 7/2011 | Jung et al. |
| 2011/0194532 | A1 | 8/2011 | Kakkad |
| 2011/0246281 | A1* | 10/2011 | Satyavolu .............. G06Q 30/02 705/14.25 |
| 2011/0263214 | A1 | 10/2011 | Robinson et al. |
| 2011/0286437 | A1 | 11/2011 | Austin et al. |
| 2011/0294539 | A1 | 12/2011 | Shin et al. |
| 2011/0310840 | A1* | 12/2011 | Kennedy et al. ............. 370/331 |
| 2011/0320588 | A1 | 12/2011 | Raleigh |
| 2012/0026992 | A1 | 2/2012 | Navda et al. |
| 2012/0047269 | A1 | 2/2012 | Leonov |
| 2012/0140651 | A1 | 6/2012 | Nicoara et al. |
| 2012/0157156 | A1* | 6/2012 | Han ..................... H04W 76/028 455/525 |
| 2012/0230193 | A1 | 9/2012 | Fang |
| 2012/0257558 | A1 | 10/2012 | Shin |
| 2012/0258726 | A1 | 10/2012 | Bansal |
| 2012/0270538 | A1 | 10/2012 | Meylan et al. |
| 2013/0022024 | A1 | 1/2013 | Chu et al. |
| 2013/0100928 | A1 | 4/2013 | Matsumori et al. |
| 2013/0100944 | A1 | 4/2013 | Kwon et al. |
| 2013/0262850 | A1* | 10/2013 | Canpolat ............... H04W 12/08 713/150 |
| 2013/0281154 | A1 | 10/2013 | Aerrabotu |
| 2013/0322316 | A1 | 12/2013 | Hara et al. |
| 2014/0113628 | A1* | 4/2014 | Sundararajan et al. ... 455/435.2 |
| 2014/0129385 | A1* | 5/2014 | Anderson et al. ......... 705/26.41 |
| 2015/0257038 | A1 | 9/2015 | Scherzer |
| 2016/0127152 | A1 | 5/2016 | Balwani |

FOREIGN PATENT DOCUMENTS

| | | |
|---|---|---|
| EP | 2170003 A2 | 3/2010 |
| EP | 2341738 A1 | 7/2011 |
| KR | 10-2004-0025222 A | 3/2004 |
| KR | 10-2011-0045885 A | 5/2011 |
| WO | 2006/126062 A2 | 11/2006 |

OTHER PUBLICATIONS

International Search Report and Written Opinion for related international application No. PCT/US2014/031912, dated Jul. 31, 2014, in 16 pages.
Extended European Search Report for related EP Patent Application No. 12851159.9, dated Jul. 14, 2015, in 8 pages.
Extended European Search Report for related EP Patent Application No. 14773816.5, dated Oct. 24, 2016, in 8 pages.
Extended European Search Report for related EP Patent Application No. 16187937.4, dated Nov. 14, 2016, in 8 pages.
Office Action and Search Report dated May 3, 2017 for related CN Patent Application No. 2012800579653.

\* cited by examiner

SYSTEMS AND METHODS FOR ESTABLISHING WIRELESS CONNECTIONS BASED ON ACCESS CONDITIONS

CROSS-REFERENCE TO RELATED APPLICATIONS

This application claims the benefit of, and hereby incorporates by reference, U.S. provisional application Ser. No. 61/805,473, filed on Mar. 26, 2013.

BACKGROUND

Related Field

The subject matter discussed herein relates generally to wireless connections and, more particularly, to establishing wireless connections based on access conditions.

Related Background

Rapid growth in mobile devices, such as smart phones, tablets, and connected laptops, and the proliferation of applications in these devices have created a tremendous need to increase wireless data communication capacity.

Mobile devices use wireless communication services provided by one or more mobile operators and/or technology companies. The wireless communication demand is often higher than the mobile operators and technology companies can provide.

DETAILED DESCRIPTION

The subject matter described herein is taught by way of example implementations. Various details have been omitted for the sake of clarity and to avoid obscuring the subject matter. The examples shown below are directed to structures and functions for implementing systems and methods for establishing wireless connections based on access conditions. Other features and advantages of the subject matter should be apparent from the following description.

This application incorporates by reference the entirety of the U.S. patent application Ser. No. 13/684,048 (the '048 application), filed on Nov. 21, 2012, entitled "Mobile Wireless Device with Intelligent Network Access Selection."

Overview

Figure 1A:
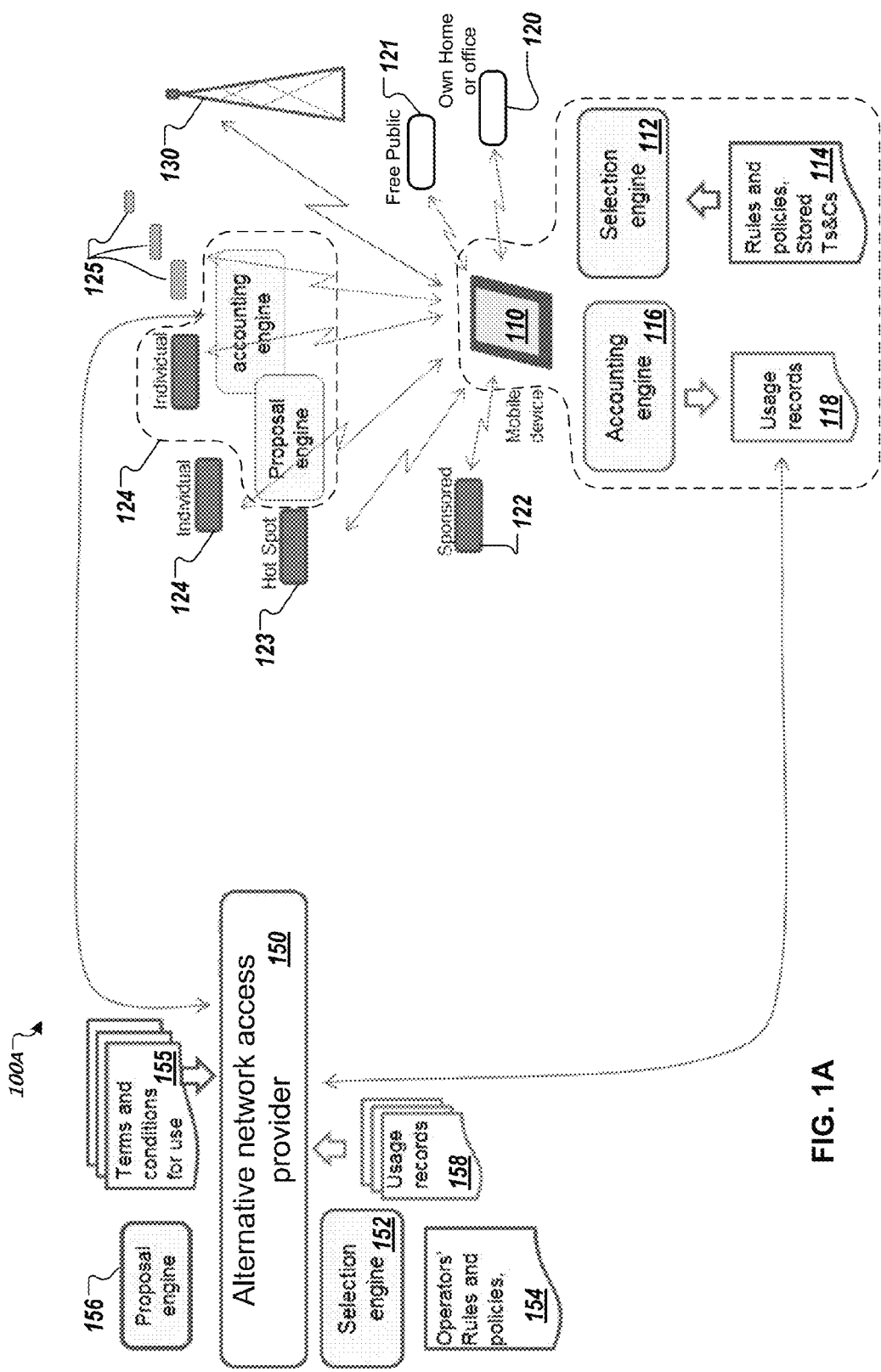
FIG. 1A is a functional block diagram of an overview of an example system for providing alternative network access.

FIG. 1A is a functional block diagram of an overview of an example system for providing alternative network access. A system for providing alternative network access may include one or more mobile devices (e.g., mobile device 110) that use wireless connectivity services and one or more providers of wireless connectivity services (e.g., connectivity providers 120-125 and 130).

The system for providing alternative network access may include the like of one or more selection engines 112 and 152, one or more proposal engines 126 and 156, accounting engines 116 and 128, and an alternative network access provider (ANAP) 150. The alternative network access provider environment includes structures and functions that enable exchange of connectivity services (e.g., matching connectivity service providers with connectivity service users).

Alternative network access provider environment 100A shows, for example, that a mobile device 110 may be within communication reach with connectivity providers 120-125 and 130. For example, mobile device 110 may be a device that uses wireless communication (e.g., a smartphone, tablet device, laptop computer, etc.). Connectivity providers 120-125, which may collectively be referred to as "access points," may provide wireless communication to wireless devices (e.g., using one or more wireless communication protocols). An access point may be any source of connectivity. In other words, any source of connectivity, e.g., connectivity providers 120-125 and 130, may be referred to as an access point. An access point may be stationary with a wired connection through an ISP to the Internet or another communication network. An access point may be a mobile device connected to, for example, a 3G or 4G network or any available connection (e.g., for backhaul) to the Internet or other communication network. The mobile device (e.g., serving as an access point) provides connectivity to other mobile devices. An access point is a device that provides wireless connectivity to a communication network utilizing any wireless protocol (e.g., the above mentioned protocols) that enables a mobile device to establish a connection to a communication network. A communication network is any network and/or access that, in combination or alone, is capable of providing data to a mobile device. One example of a communication network is the Internet.

Access points 120-125 may be owned and/or operated by different entities. Connectivity provider 130 may be one or more cells (e.g., cell towers) of a cellular network. Connectivity providers 120-125 and 130 are equipped and/or configured with the capability to provide connectivity services to mobile device 110 for voice and/or data communication. Each of the connectivity providers 120-125 and 130 may use one or more wireless communication protocols, such as 2G (e.g., GSM, GPRS, EDGE, iDEN, TDMA, CDMA), 3G (e.g., CDMA2000, 1x-EVDO, P25-LMR, WCDMA, UMTS, HSPA), 4G (e.g., LTE, WiMAX), VoIP, IMS, IPTV, WLAN, Wi-Fi (e.g., one or more of the family of 802.11 standards from IEEE and the like), Bluetooth, and other radio-based wireless protocols, to communicate with mobile devices (e.g., mobile device 110). The protocols (e.g., those of 2G, 3G, 4G, LTE and later) used by a cell tower of a cellular network may be referred to as cellular protocols. Mobile device 110 is equipped and/or configured with the protocols used by the connectivity providers to communicate with mobile device 110. (The spelled out terms of the acronyms used herein are provided at in the last paragraph.)

Access point 120 may, for example, be a Wi-Fi access point owned and/or operated by the user of mobile device 110. Access point 121 may be a free access point (e.g., provided at a city library), access point may be a commercial-based access point, access point 123 may be provided (e.g., for a fee or subscription) by a vendor or business (e.g., a coffee shop or an internet service provider), and access points 124-125 may be provided by other persons, businesses, and/or entities. Connectivity provider 130 (e.g., a mobile network operator) may be one or more cell sites of the cellular network that provide cellular and other wireless communication services to mobile device 110. For example, cell sites of connectivity provider 130 may support 3G and/or 4G (e.g., LTE, WiMAX) protocols. Services provided by connectivity providers 120-125 and 130 may be "announced" or broadcasted to mobile device 110 and/or alternative network access provider 150 using, for example, proposal engines.

The proposal engines can be implemented in the access points 120-125 (e.g., proposal engine 126 in access point 124), in a network (not shown), or on computing devices (e.g., data center, servers, etc.) of alternative network access provider 150 (e.g., proposal engine 156) that communicates with the mobile device 110. The proposal engine provides, for example, access or a reference to the terms and conditions (e.g., terms and conditions 155) for using a particular connection or connections. Mobile device 110 may determine whether to use services provided by a connectivity provider based on its terms and conditions and possibly various other data from other sources including measurements of signal strength or other parameters by the device.

Mobile device 110 may use connectivity services for a new communication or an existing communication (e.g., changing and/or adding connectivity services). For example, when mobile device 110 needs to initiate a new communication, mobile device 110 may receive information on available access points and select one, two, or more access points to use for the new communication based on the provided information about the access points (e.g., terms and conditions for connectivity services and possibly various other data from other sources). Mobile device 110 may change or add connectivity services providers for an existing communication. For example, when mobile device 110 has changed location or the characteristics of the existing communication (e.g., performance) have changed, mobile device 110 may request information on available access points and select one or more access points to use for the existing communication based on the provided information above the access points (e.g., terms and conditions for connectivity services and possibly various other data from other sources). Information on and/or about an available access point (e.g., access point 124) may be provided by the access point (e.g., proposal engine 126 of access point 124) and/or alternative network access provider 150 (e.g., proposal engine 156).

Mobile device 110 may determine, select, or identify one or more available connectivity providers 120-125 and 130 to connect with (e.g., for connectivity services) using a selection engine. In some implementations, a connectivity provider may be selected exclusively for a specific application (e.g., a gaming application). The selection engine can be implemented as a module that can work inside the mobile device 110 (e.g., selection engine 112) or on computing device of alternative network access provider 150 (e.g., selection engine 152) that communicates a selection with the mobile device 110, or as a cooperative combination of functions executed on the mobile device 110 and on a server computer of alternative network access provider 150.

A selection engine may determine to select a connectivity provider based on information associated with the specific access point as established by the connectivity provider (e.g., terms and conditions of connectivity services). The connectivity provider controls and/or manages the access point and its connection to the communication network or the Internet. In some implementations, information associated with a currently used access point may be considered in deciding to select an alternative or additional access point. Once a determination is made to select an access point, the access point may be selected using any identifying information (e.g., a SSID, BSSID, MAC address, a unique identifier, a combination thereof, or the like).

Services used (e.g., by mobile device 110) and services provided (e.g., by a connectivity providers 120-125 or 130) may be accounted for using accounting engines. The accounting engines can be implemented in mobile device 110 (e.g., accounting engine 116) and/or in one or more access points 120-125 or in another computing device in the network connected to the access point, for example in an access control gateway (e.g., accounting engine 128) that keep track of the usage of the connections and report it to the alternative network access provider 150.

In some cases the accounting engines 124 in the access point or network or access control gateway are controlled by the connectivity provider that controls and manages the access points. In these cases they may not report the usage to ANAP 150 but rather use the usage records collected by accounting engine 124 as a means of auditing the usage records collected by the accounting engine 116 and reported to ANAP 150. For example, during or after the end of a communication, mobile device 110 may report usage records 118 to ANAP 150. An access point (e.g., access point 124) used by mobile device 110 may report usage records (not shown) to ANAP 150 or use them for auditing purposes as mentioned above. ANAP 150 may store usage records (e.g., usage records 158) for reporting, billing, and/or issuing payments for the connectivity services on record (to be described in FIG. 1B below).

In some implementations, one or more accounting engines can be implemented outside of mobile device 110 and access points 120-125, such as at an access gateway server in the network and/or on one or more servers of the alternative network access provider 150.

A alternative network access provider environment, which may be referred to as an "alternative network access provider ecosystem" (e.g., proposal engines, selections engines, accounting engines, and alternative network access provider 150, all of which are described in further details below) enables wireless devices (e.g., mobile device 110) to use wireless connectivity services from a variety of connectivity services providers (e.g., access points 120-125). From the perspective of the connectivity services providers, an alternative network access provider environment enables connectivity services providers to provide services to different wireless devices.

The alternative network access provider environment enables commerce or micro-commerce on providing data connectivity (e.g., bandwidth or data connectivity or transfer services measured either as the number of bytes transferred over each connection or as time the connection was available or any other parameter recorded as a usage record). Embodiments of alternative network access provider can include agreements (e.g., terms and conditions 155) with wireless operators/service providers (170 and 180, FIG. 1B) and/or individual mobile device users (e.g., user of mobile device 110) as well as with a number of individuals and/or companies that own or control Wi-Fi access points 122-125, and with wired and/or wireless Internet service providers (190, FIG. 1B). For example, an Internet service provider may deploy access point 123 as a wireless gateway or hot spot.

Figure 1B:
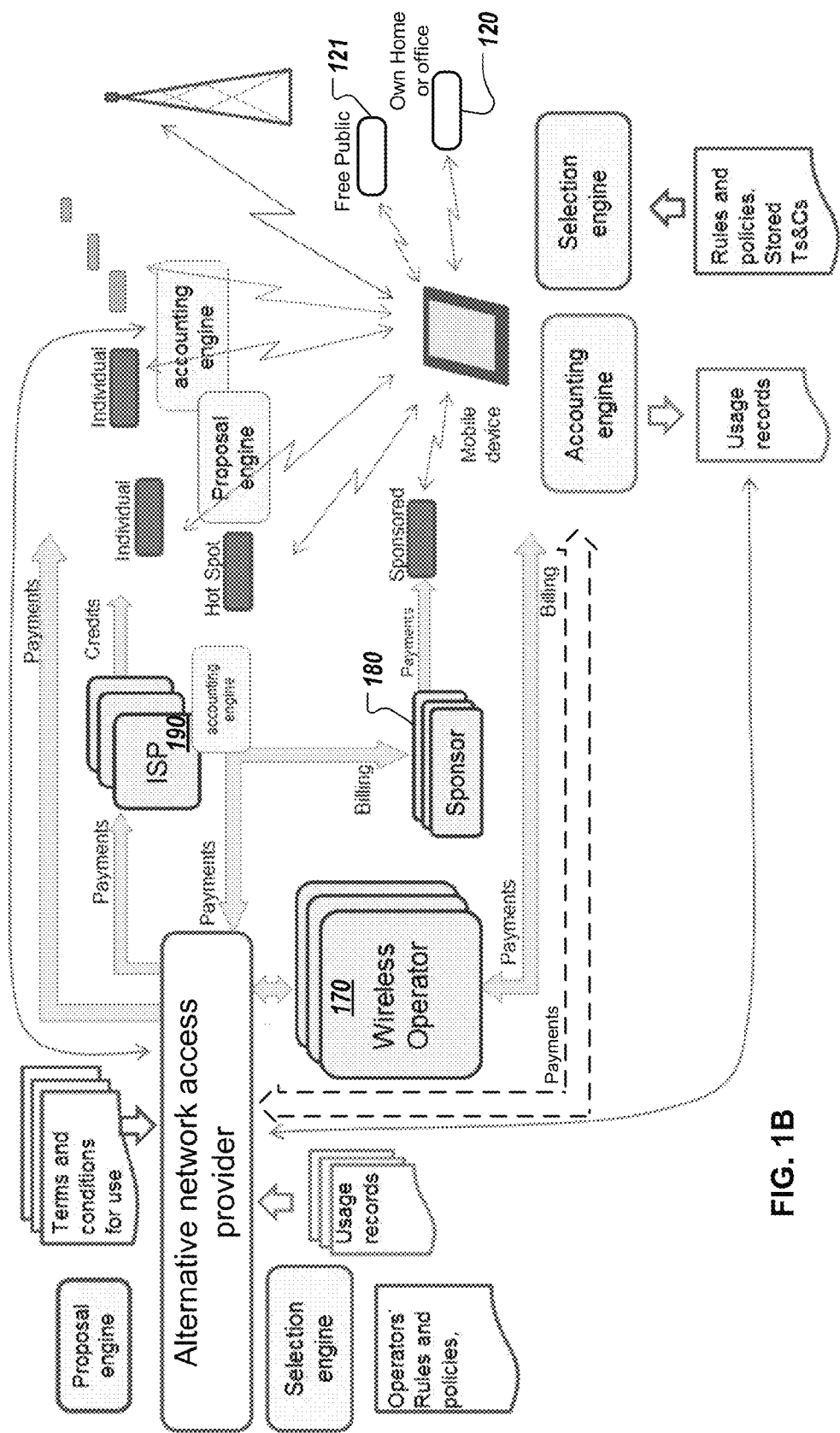
FIG. 1B is the example system for providing alternative network access of FIG. 1A with financial components.

FIG. 1B is the example system for providing alternative network access of FIG. 1A with financial components depicted. One or more wireless operators 170 may sponsor one or more access points owned and/or operated by connectivity providers 120-125 to provide connectivity services to mobile devices contracted with the wireless operators 170. Other sponsors 180 (e.g., online retailers, financial institutions, employers, gaming service providers, advertisers, etc.) may sponsor "free" connectivity services (e.g., provided by connectivity provider 122) to users of the sponsors' services. Internet service providers (ISPs) 190 may own and/or operate access points 123 and 125 to provide connectivity services. In the example of environment 100B, ANAP 150 may serve as an enabler to match the connectivity providers 120-125 and connectivity consumers (e.g., mobile device 110). Various payment and billing arrows connecting ANAP 150, wireless operators 170, sponsors 180, ISP 190 to indicate that various payment and/or billing routes are possible based on the relationships of the services sponsors and consumers. Providing billing and payment services to all parties are described further below.

Figure 2A:
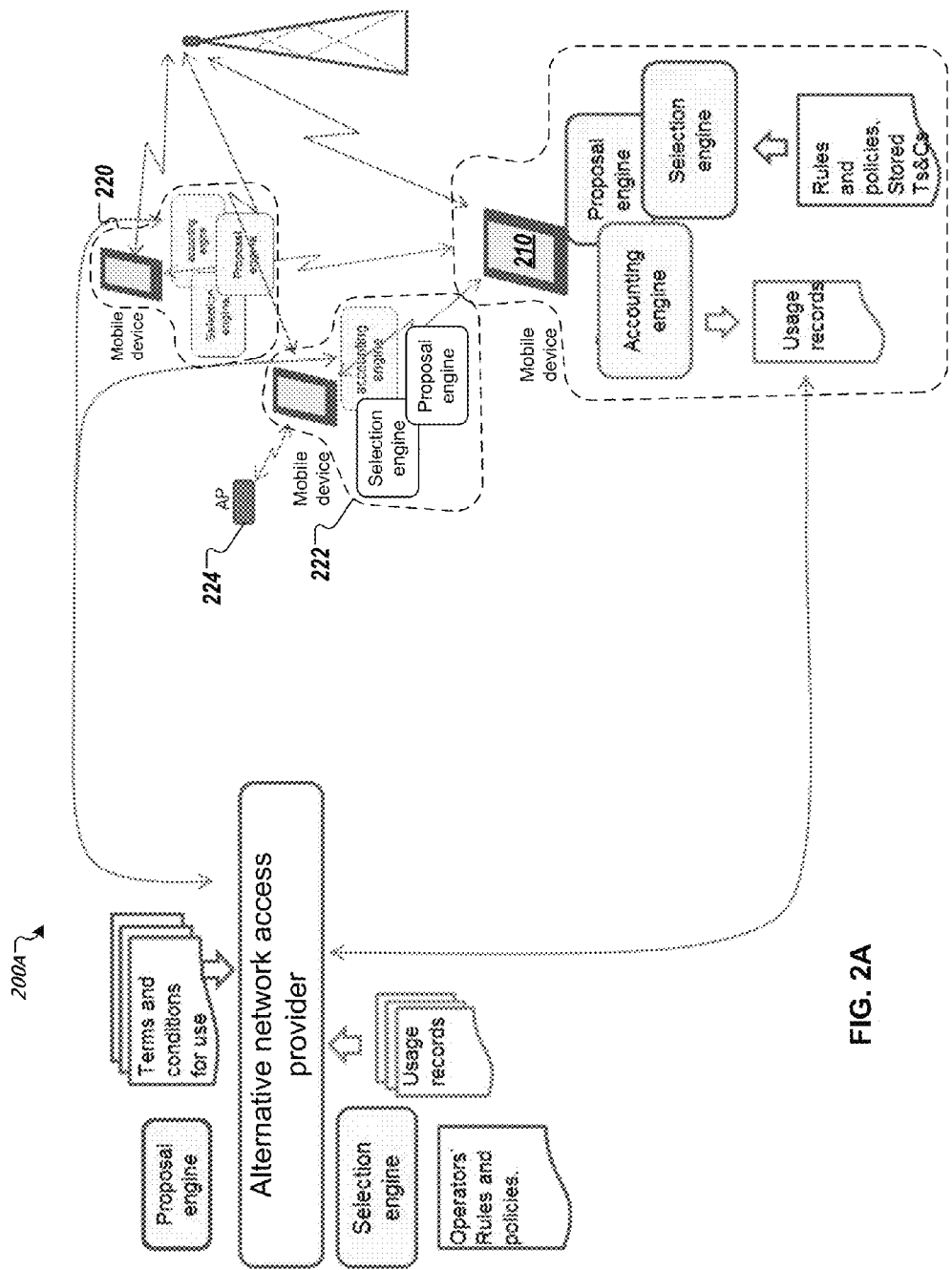
FIG. 2A is a functional block diagram of an overview of another example system for providing alternative network access.
Figure 2B:
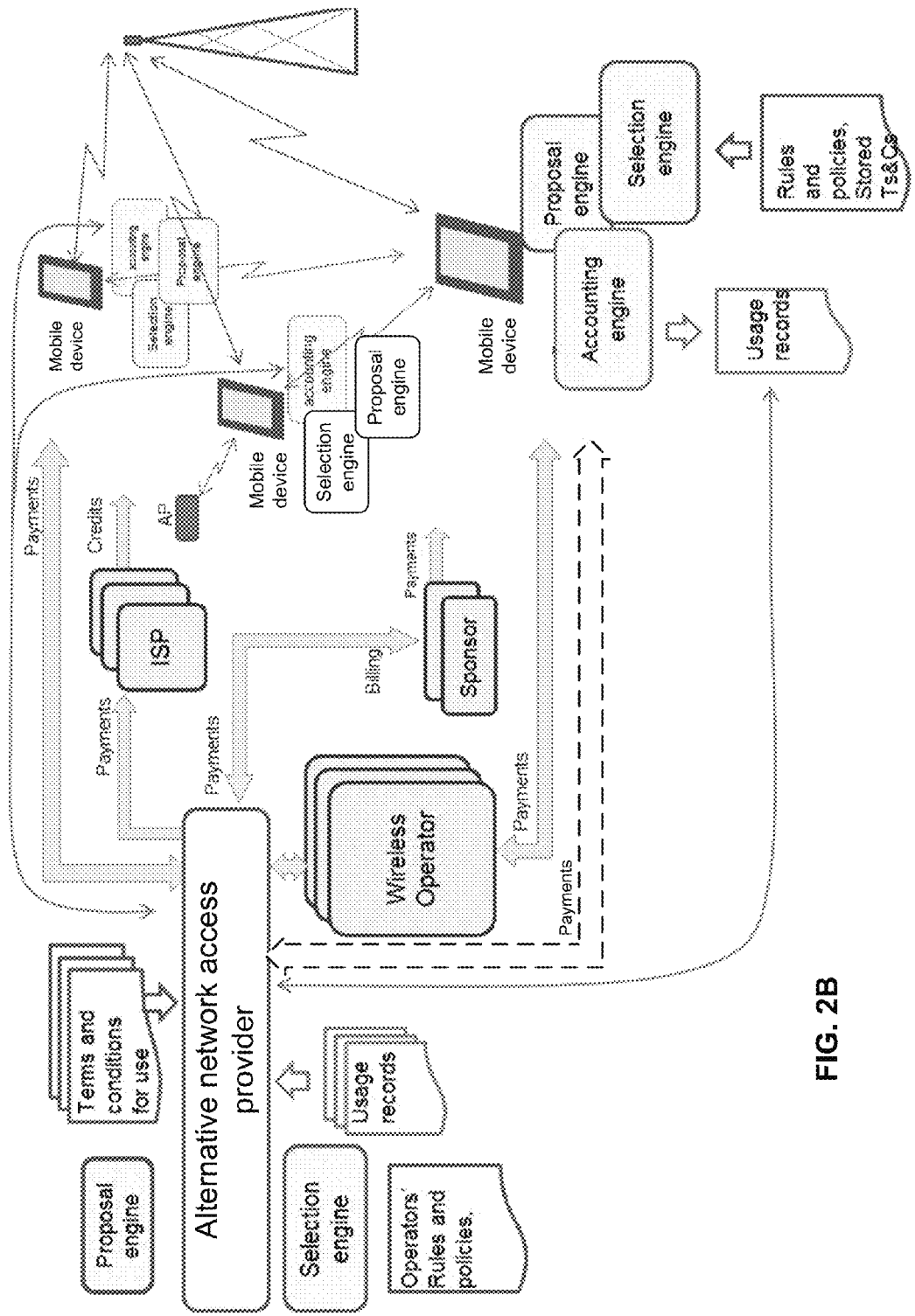
FIG. 2B is a functional block diagram of the example system for providing alternative network access environment of FIG. 2A with financial components.

FIG. 2A is a functional block diagram of an overview of another example system for providing alternative network access. FIG. 2B is a functional block diagram of the example system for providing alternative network access environment of FIG. 2A with financial components. FIGS. 2A-B are similar to FIGS. 1A-B except for mobile devices 210, 220, and 222. Mobile devices 210, 220, and 222 each is shown with a selection engine, a proposal engine, and an accounting engine. In FIGS. 2A-B, mobile devices 210, 220, and 222 may function as connectivity service providers. For example, as shown, mobile device 210 accesses connectivity services provided by mobile devices 220 and 222.

Selection Engine

A mobile wireless device that participates in the alternative network access provider system may have the ability to establish multiple wireless connections and/or change one or more wireless connections. For simplicity a system that utilizes both Wi-Fi and 3G wireless connections is described, but the same solution can include other available wireless connections (2G and/or 4G, Bluetooth and/or any other wireless radio access). Managing this connectivity in the mobile device or available to the mobile device through a network connection and operating on an alternative network access provider server system is a module referred to as the selection engine 112 and 152. The selection engine bases its operation on rules and policies 114 and 154 that have been set either by the wireless operator or the end-user of the mobile device 110, or any combination of rules and policies 114 and/or 154. In some implementations there is a selection engine both on the device and on the server system and the two operate in tandem using rules stored on both the device and the server. In some cases some rules are controlled by the operator and others are at the discretion of the user. There can be a set of defaults so that the user does not need to do anything to activate the system.

In one implementation of the selection engine 112, the rules and policies 114 together with information about access points in the vicinity of the mobile device may be downloaded to the mobile device and are subsequently used to make an initial decision of connecting using the selection engine 112 when no other network connection of sufficient quality and speed is available. This initial decision may be based on a simpler and less dynamic set of rules and information. Once a connection to the server and the selection engine 152 is established, the rules and policies 154 by selection engine 152 are used together with other information to revisit and possibly revise the initial selection. The rules and policies 154 may have a higher frequency of updating than the rules and policies 114. Also the rules and policies 154 may be more complex and include more parameters than the rules and policies 114. In case the decision is revised to abandon the connection because a rule or policy 154, there may be a minimum time period until the connection is severed to avoid a negative user experience of enjoying only a momentary connection.

The rules and policies 114 and/or 154 control which of the available connections will be selected at any given time for each of the applications that need a data connection. The level of sophistication in the selection process may vary among different implementations. For example, the following factors may be included in the decision-making (e.g., in selecting the connections to use). These factors or a subset of these factors may be collected (e.g., data associated with the factors) for each connection that the mobile device 110 can detect at the time of selecting the connection to use for each application. The factors or access conditions include:

price and other terms and conditions offered for of using each connection of devices the access points participating in the ANAP system (the Ask price). These may be provided by the proposal engine as described in the next section. The Ask price is very specific to the access point and may depend on a number of factors including time of day, day of the week or month, dynamic network operating parameters such as the load. It may also depend on the characteristics of and parameters associated with the mobile device for example the service provider associated with the device. The Ask price may also be dependent on the buyer of connectivity services.

the price and other terms and conditions offered by the buyer of connectivity services for the specific device at the specific time and location (the Bid price). The offered (Bid) price may depend on a number of other parameters as well, including the day of the week or month, the cell tower, sector or other access point that the device is connected to, dynamic network operating parameters of the currently used network and other information available to the ANAP 150 system or the mobile device. These may include information about the mobile device, its contract with a cellular service provider or the association of its end user with other organizations. For example, if the end user has a subscription with a certain connectivity service provider (possibly a cable broadband service provider) and the particular access point for which the price is being offered belongs to the (hot spot) network of the connectivity service provider, the Ask price may be set to zero, while it would not be zero for end users that do not have such subscription.

quality of the signal based on measurement of the signal strength or signal-to-noise ratio or any other relevant parameter that is available from the radio system for each possible connection that the device can detect.

level of security available for using the connection.

throughput capacity of the connection.

reliability (packet loss) of the connection.

latency and jitter of the connection.

bandwidth need or any other specific need for characteristics of connectivity of each application running on the wireless device or any application that the device has a need to initiate.

the specific application on the device that is requesting the access to or is already using mobile data.

the web site or specific service that the application is requesting to access.

information about special promotions or sponsorship for the connection.

buyer or potentially several alternative buyers for the connectivity service. It is possible that for a specific connectivity service the cellular service provider is the buyer, but the buyer may also be a sponsor, for example a company that provides access to data when a specific application is "on top" or the main active application on the device. The buyer may also be the end user of a device. Each buyer may have a different offer (Bid) price for the connectivity service.

acceptability of delay in transmitting the data as pre-specified by the application provider or the end user for each application and the time elapsed from when the original request by an application was made for the data transmission (For example, it may be specified as acceptable to delay uploading photographs to a website by one hour and the system may wait to see if a free connection becomes available within this interval before selecting a connection with a non-zero price or the system may have different acceptable delays for using different cost levels or other specified characteristics of connections.)

estimated drain on battery power of using the connection.

the speed, reliability or other characteristics of any connection that the device is currently using or has been using in the past, for example if available data transfer speed of the connection provided to the mobile devise by the mobile network operator with whom the end-user (subscriber) on the mobile service has an agreement falls below a set limit the connection decision may be affected. Another example is a situation where the device is connected to an access point 120 to 125, but the speed of the connection or packet loss or other parameter falls below set limits. In this case the decision about the connection would be revisited using the new information about the existing connection.

the result of a speed test, or other performance test of the connection. The mobile device may conduct a speed test or other performance test of its connection to the access point 120 to 125 or 130 at any time, for example immediately after establishing the initial connection. The speed or performance test may be based on observing the data access speed of another application that is communicating over the network or it may be a speed test that is specifically initiated by the device to check the quality of a new connection immediately after establishing the connection. If the result is below a pre-set limit, which limit may depend on the device and on applications on the device, the selection engine may reverse the decision to connect to the specific access point and instead select another access point 120 to 125 or 130. One possible implementation utilizes criteria that include the data transmission speed observed immediately before connecting to the new access point. For example the decision to connect may be reversed if the data transmission speed is not higher than it was before changing the connection. In another implementation the speed test of the connection may be preceded by checking the encoding rate that the radio access network (RAN) provides for the connection. Using this as a criterion will, for example, improve the accuracy of estimating the connection quality from the signal strength. It will also help, for example, ensure that the device will not consume a disproportional share of the RAN airtime. If the encoding rate is too low, the selection engine may disconnect the mobile device from the access point.

the geographic location of the device.

the radio (cell base station) that the device is connected to.

information about the movement of the device from any motion sensors or accelerometers or from tracking the GPS data.

special instructions (e.g., from the network operators, mobile device users, and/or access point operators). For example, there may be an API between the ANAP system and the network management system of one or more of the primary access network service providers. This interface may be providing real time requests to the ANAP system to move specific numbers of mobile devices (or a number of devices representing a certain aggregate (short term average) rate of communication, away from specific nodes of the primary access network (or cellular sectors) to alternative network access, or to move specific numbers of devices, or devices representing a certain aggregate communication rate, away from alternative access in case they can be moved onto specific primary access network nodes. The ANAP can use the special instruction feature of the Selection Engine to implement responses to the requests. In this case the identification information about the node of the primary access network, which is communicated by the device in conjunction of each scan record, is used to manage the special instructions. This way the API can enable the network management system and ANAP to work in cooperation to provide a real time load balancing function for the primary access network.

In a similar way the alternative network access providers may be managing and balancing load in their system by issuing specific instructions, either in a priori communicated maximum numbers of connected devices or maximum data communication rates or through a real time API to the selection engine in the ANAP system. In many cases the access points are connected to the main communication network infrastructure (for example the internet) through, for example, a tree-like network topography where sets of access points are communication via specific nodes (or junctions) in the backhaul network. Congestion manifests itself at this node level and a specific group of access points may in certain times reach the aggregate maximum capacity at the node level. By communicating the maximum capacities before hand, or setting aggregate limits to specific groups of access points, or by establishing a real time communication system the alternative network access providers can enable the ANAP system move mobile devices off access points supplied by specific backhaul nodes and possibly continue providing the alternative access to mobile devices in specific primary wireless access network nodes by utilizing alternative access points that belong to other backhaul nodes in the alternative access network but can still serve devices in the same primary access network nodes.

In some implementations, some of the connection alternatives may have lower cost or be free. For example, one or more access point (e.g., access point 122) but may be sponsored by a business that provides free wireless access in exchange with acceptance of commercial messages and advertising. Business entities (e.g., gaming companies) may provide free access to certain web sites or services; or by certain applications (e.g., gaming applications). For example service providers or vendors may sponsor connectivity that allows the end user to visit their website and make purchases. Other access points may offer lower cost or free connectivity but require the right to collect location-based information of the user or may require responses to surveys. One example of useful location based information would be to collect the GPS system location of devices at specific intervals to measure the speed of traffic flows on roads and freeways. This could be a commitment by the mobile device user that would be valid even when the system is connected through the regular 3G network, but could still earn privileges to use alternative network access provider connections as a form of compensation.

The selection engine is the function that makes the selections about which data connection to use for each of the applications in the Mobile wireless device. In one embodiment this is done on a real time moment-to-moment basis based on the rules and policies and current information, including price information and possibly other information as listed above, about each available connection. This information may be available directly from the access point for example by using the recently established 802.11u communication standard, or it may be obtained from the alternative network access provider 150 based on a reference system that is explained in more detail in the section proposal engine below.

In one embodiment the selection engine uses specific criteria set by the operator or the device user that authorizes the use of connections based on a combination of two main parameters: The speed or other quality parameter of the connection that is currently available to the device (in the 3G or 4G system from the operator) and the cost of an alternative (supposedly better or faster) connection through the alternative network access provider system. The system may have thresholds for the quality parameter and acceptable cost. For example the tiers could be: a) at 300 kb per second and cost of up to three cents per megabyte is authorized b) at 100 kb per second the cost of up to five cents per megabyte is acceptable; and so on.

In an embodiment where the selection engine is hosted on a computer device on the network or in the alternative network access provider system the mobile device 110 will send the set of selection factors and parameters to the selection engine on the computer system and the selection engine will return to the mobile device the identifying information and the necessary authentication information for connecting to a connectivity provider that will provide the selected connection. In this configuration the cloud based selection engine may use information about and from all the other mobile devices connected to the same radio access network node (or cell sector) to determine its specific instructions to each of the devices. For example, if the primary access service provider has specified a maximum data transfer rate for a specific node, or a maximum number of (active) connected devices and the ANAP can determine from recent scan data and report transmissions form the mobile devices that the number of connected devices, or their aggregate data communication rate is approaching or exceeding the limits specified by the primary access service provider, the ANAP can issue instructions to an appropriate number of specific mobile devices that have the most advantageous opportunity to move their connections to alternative networks to, indeed, move their connections away from the primary network node to the alternative access network. In this alternative embodiment the reports from mobile devices would include the total amount of primary network data transfer capacity used since the previous report and possibly the recent average rate of data communication, at least for the specific nodes that are using this particular method of load management. Most advantageous in this situation may be determined by the (unit) price of alternative network access or by the anticipated quality of the connection or by a combination of these and other factors. Instead of comparing the number of connected devices or rate of communication to specified maxima the selection engine may also use a target number of devices to be moved to alternative access or a target rate of aggregate communication that is to be removed from the specific primary network access node. In this embodiment it would not be necessary to provide frequent reports of the rate of primary access network communication. These targets may be provided by the operators of the primary access network providers and may be dependent on time of day, day of week and the specific primary access network node and other parameters. In yet another embodiment the ANAP will arrange to have a dedicated device within each cellular sector for the purposes of measuring momentary congestion. That device will, for example, report the estimated congestion level at regular intervals and/or other predetermined times to the ANAP system, which will then manage the number of mobile devices moved to the alternative access network using the congestion signal as a feedback loop. The device measuring congestion may be a mobile device running a speed check or speed test that confirms that at least a certain amount of data transfer speed is available.

In another embodiment where the selection engine is primarily hosted by the mobile device, the mobile device will use the selection factors available from the proposal engine (as described in the next section) to make the selection of an access point through which it will establish a connection. It will then communicate this information to alternative network access provider 150 and in return receive the authentication information that will enable the connection. The authentication information can be, for example, transmitted and/or exchanged using a protocol (e.g., 802.11x) that is the same or different from the protocol used in communication.

In another embodiment the selection engine will compare the offered selling price (Ask price) and the offered buy price (Bid price), which both are dependent on a number of parameters as described above. In cases that the Ask price plus a possible commission or other compensation for the ANAP system added on by the selection engine is lower than the Bid price the selection engine establishes a clearing price for the connectivity service. This price may be a price per Byte transmitted or time of connectivity or any other parameter. This clearing price is then applied by the accounting engine for establishing the necessary payments and settlements between the buyer and the seller.

Once a connection is selected the selection engine will provide to the mobile device any information that is necessary to establish the connection through the selected access point. This authentication and authorization information may include wireless passphrases or passwords, account identification information and passwords, it may also include credentials for an access control gateway, it may include detailed information about how to post the user name and password to a page on an access control captive portal page or it may include digital certificates and other more advanced access control tokens and parameters. The selection engine controls these authentication and authorization elements, which may be stored in encrypted form either in the selection engine database within the selection engine 112 or 152. In case of storage the parameters may be downloaded together with the other information about the access points in the vicinity of the mobile device. These parameters may have expiration times and they may be changed at regular intervals. The parameters are made available to the mobile device's connection functions only at the time of connection and are subsequently erased from its memory. The end user will not have any access or visibility to the authentication or authorization parameters used by the selection engine, except in cases where the end user provides such parameters for the system to use.

In one embodiment, based on the connectivity selections and subsequent data traffic through each connection the mobile wireless device creates a detailed record on the actual use of each of the alternative connections utilizing another module called the accounting engine. At intervals the accounting engine transmits the usage record to the alternative network access provider 150, including its own identifying information and the identifying information of each of the access points that provided the connectivity for each use, identification of the selected buyer of the connection, the negotiated price point for the connection, as well as information about the terms and conditions in force at the time of the use. The usage data can be in the form of numbers of sent and received data bytes, time duration of connectivity or any other relevant variable describing the use. These record keeping functions are described in more detail in the section about the accounting engine below. The reporting of the connection parameters can be performed in any manner. For example, the reporting can be performed using the RADIUS accounting standard for mobile devices.

The usage data collected at the mobile device may also include information about the application that was using the data and about websites or other resources that were accessed by the application during the data use. This information may also include other parameters of the connectivity service, for example the connection speed, jitter, latency or other performance characteristics. It may be collected by the mobile device (e.g., using its accounting engine) for all of the data including both the data provided by the alternative connections 120 to 125 and the connection 130 including in situations where 130 is the cellular data service provider for the mobile device. This data may be communicated to ANAP 150 and used in directing billing to possible sponsors of wireless connectivity, for example providers of game or other entertainment applications or content or companies that wish to sponsor visits to their web sites where they may sell goods or services.

In some implementations the operating system (e.g. Android or iOS, or Windows operating system) in the mobile device enables use of mobile data by any application and regardless of the web sites or resources that are accessed. In such case the ANAP system and the accounting engine may include a specific browser version for accessing web sites and other resources on the network that controls and limits the resources that can be accesses using the accounting engine controlled browser. The browser/accounting engine also includes a module that keeps track of the web sites visited and other resources accessed and stores the number of bytes used for each access of a web site/web page or resource. This information can then later be used to allocate usage per resource. The system can be used to enable third parties, such as gaming application providers, web stores or content providers sponsor or provide free or reduced cost access to end users specifically for accessing their products and services on the web. The tracking may cover any and all available access points and networks and the stored usage data can be used but the ANAP to provide appropriate crediting of charging records to accolade the costs according to the sponsorship arrangements.

Other statistics about the location of the device, signal quality, throughput, performance of the access points and other parameters regarding connectivity such as the speed and availability for connecting through the mobile operators 3G or 4G systems and the specific time and location or the used cell tower ID of these observations may be collected and transmitted to alternative network access provider 150. The alternative network access provider 150 may use this data to compile useful information about the quality of connectivity in various locations and the need for data capacity including time-of-use data and historical trends. This information could be sold to wireless network operators or be made available (possibly for a fee or in the form of a marketing campaign) to owners, or potential future owners of access points, or residents or owners of buildings and other structures in each area. The information could be used by such operators and owners to make decisions about pricing or adding capacity in the form of registering existing access points with alternative network access provider, installing new Wi-Fi access points or other alternative networks. These actions would provide an opportunity to the owners of the buildings or access points to participate in the commerce of bandwidth through the alternative network access provider.

It is important to note that selection engine may use several different radio connections simultaneously. These may be selected individually for different applications running on the mobile device or may be aggregated to provide a higher total data transmission capability for a single application. In other words mobile devices can "pool" resources to increase the data transmission speed. This is described in more detail below in the section about resource pooling.

The selection engine uses a combination of information to implement the rules and policies for selecting connectivity. For example, it is aware of the connections provided directly by the wireless operator using their own network and is familiar with the connectivity through access points that have been configured to the wireless device by the end user. For example, these would include the access points at the user's home and office and other locations where free connectivity is available. However, in the alternative network access provider system, a new and important source of real time information about connectivity is available from a proposal engine residing in third-party access points (or in the network, or cloud, at a location from which it can be accessed by the selection engine). In order to participate in providing the enhanced connectivity through the alternative network access provider, each access point must have a proposal engine or provide a reference to a proposal engine.

Proposal Engine

The proposal engine (e.g., proposal engine 126 or 156) may be implemented, for example, as a module for or associated with each access point. A proposal engine associated with an access point provides information about that access point (e.g., the availability, connectivity services provided, and/or other information) to mobile devices (e.g., to the selection engines associated with the mobile devices). This information may include the terms and conditions including the price (Ts&Cs) of use of connectivity through the access point and may include detailed information about the characteristics of the connection. Implementations of the proposal engine may vary depending on the sophistication and capabilities of the access point device and the organization or individual that owns or controls the access point as well as the technical and business arrangements that provide the internet connectivity for the access point.

In some implementations, a proposal engine associated with an access point may be deployed outside the access point (e.g., by a computing device on a network, at a cloud computing resource of the alternative network access provider or its partner, etc.). These implementations allow access points that can only broadcast their SSID and/or a unique identifier (e.g., a BSSID, MAC address, etc.) to be used in an alternative network access provider environment to provide connectivity services to more mobile devices (e.g., mobile devices not manually configured to use the access points).

Figure 3:
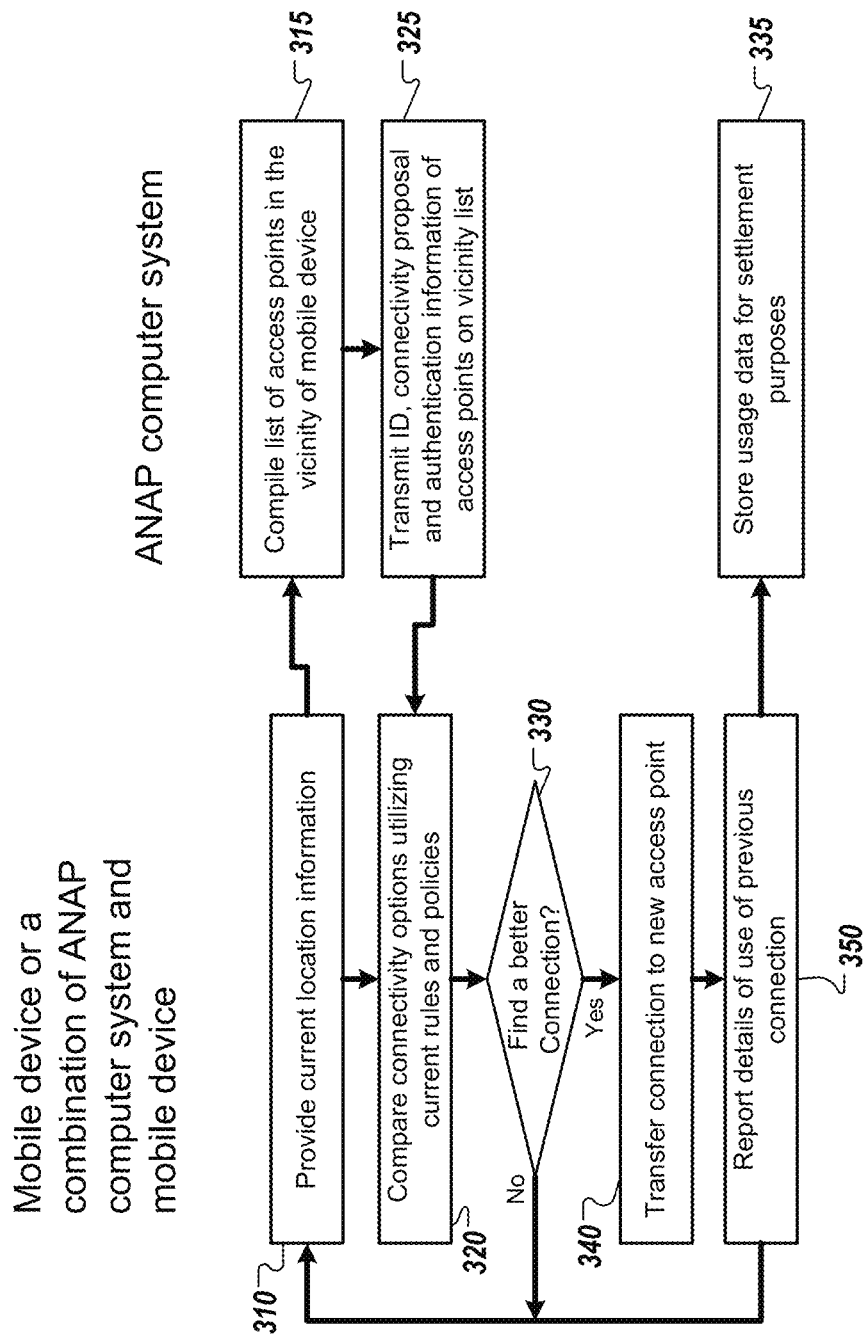
FIG. 3 is a flow chart of an example process of maintaining connectivity in a where a mobile device may be changing locations.

Selection engines of mobile devices that can receive the beacons of the specific access point can obtain the Ts&Cs and other information from the alternative network access provider by using the identifying information (for example SSID, a BSSID, MAC address, a unique identifier) of the access point as a reference. In one possible implementation this is facilitated by including in the SSID of the access point an indication or information about its participation in alternative network access provider (for example by including a specific string of characters, such as the letters "ANAP" in the SSID). The selection engine may check for the Ts&Cs at an alternative network access provider without having to go through lists of participants' BSSIDs (or MAC addresses, unique identifiers, etc.). In some implementations, alternative network access provider provides periodic downloads of BSSIDs (or MAC addresses, unique identifiers, etc.), SSIDs, location, associated Ts&Cs, and any other identifying information about the participating access points that are located in the vicinity of the current location of the mobile device. This expedites access to the relevant Ts&Cs and makes it possible to have this information available even in situations where the device does not have an open data connection to the internet or alternative network access provider (e.g., cellular devices that cannot see a cell or Wi-Fi-only devices). The location information can be obtained from the mobile device's GPS system if available or by having the access point transmit SSID's (or BSSIDs, MAC addresses, unique identifiers, etc.) of access points (whether alternative network access provider registered or not) in its range and having the alternative network access provider system correlate these to a database of access point locations. For rapidly changing locations (mobile device in a moving vehicle) alternative network access provider can extend the range of access points to include in the direction of the movement. This process of maintaining connectivity in this alternative is illustrated in FIG. 3. The downloads may be scheduled to happen on regular intervals or they may be scheduled to take place every time a device has network access (possibly establishing a minimum interval between downloads). This mechanism is particularly important to enable devices that may only have one network access system, such as a Wi-Fi only tablet or Personal Computing device.

FIG. 3 is a flow chart of an example process of maintaining connectivity in a situation where a mobile device may be changing locations. At block 310, a mobile device may trigger or request information about available access points (e.g., access points not already configured or set up to use by the mobile device). For example, a mobile device may provide the current location information to an alternative network access provider (ANAP) computer system or server. At block 315, ANAP system may compile a list of one or more access points (e.g., those in the vicinity of the mobile device and/or available for use) that have been registered to provide connectivity services in the ANAP system. At block 325, the ANAP system may provide (e.g., via a download) information about one or more access points to the mobile device. The information about an access point (AP) may include:

the party that is offering the connectivity services (this party may be referred to as a source, supplier, seller, provider)

the offered price, that can be used for all circumstances, at least for the first connectivity for a few minutes, until the device can connect to the sever to get an updated price (this is important to make the system work for Wi-Fi only devices and under conditions where cellular devices are out of coverage or congestion makes it impractical to get a current quote over the cellular network). Note that the offered price may be specific to the mobile device, a type of device, a user, class of users, etc. For example, the server may be aware of attributes about the device and can tailor the pricing in accordance of the device one or more sponsors. A sponsor may be a party that is going to be paying for the connectivity services. For example, a cellular service provider may sponsor or pay for the services made available to users of the cellular service provider. A business (e.g., a coffee shop or online gaming provider may be a sponsor to allow patrons of the coffee shop or users of the gaming providers to gain free access to connectivity services (to be paid for by the sponsors). A device owner can be a sponsor (e.g., a subscriber of services that include the connectivity services provided by the access points.

the offered price for using or consuming the connectivity services (e.g., the bandwidth). This is the price that is acceptable under all circumstances, at least for the first couple of minutes, until the device can connect to the server to get an updated price.

This information is made available for a number of access points within a certain radius (e.g., 10 miles) around the current location of the device (or around a location that the device owner has specified through the user interface. At block 320, the mobile device may compare connectivity options (e.g., with existing/using and/or other access points, using current rules and/or policies) then scan for access points and obtains identifying information for the ones in range. It also measures the signal strengths of each. At block 330, the device then combines the pre-loaded information and locally available information from the device to make the determination of which connection is the best. In one implementation the rule may be as follows: set a threshold value for the signal strength (this would typically correspond to a good signal, adequate to get a good high speed connection) above this signal level the decision is made based on price. The lowest cost wins. Below the threshold decision of choosing the AP is based on signal strength. As long as the offered buy price is higher than the offered sell price, the AP with the best signal is selected. Once a connection is established it may be re-evaluated in light of the above rules and information if the signal strength falls below a set threshold, or it is possible that a timer is set to re-valuate at specific intervals to see if a lower cost or a better signal connection is available. The intervals may be static or they may be dependent on the price of the connection or any other parameter known to the device.

At block 340, a connection or communication may be transferred from an existing connection to the newly established connection. For example, the mobile device and/or the access point at the other end of the existing connection may disassociate the communication. The mobile device and/or the newly identified access point at the other end of the new connection may associate the communication. At block 350, the mobile device may report details of use of a previous connection (e.g., one that has been disassociated) to the ANAP system (if the access to the disassociated access point is facilitated by the ANAP system). At block 355, usage information may be stored by the ANAP system for billing, payment, analysis, and/or other purposes.

Figure 4:
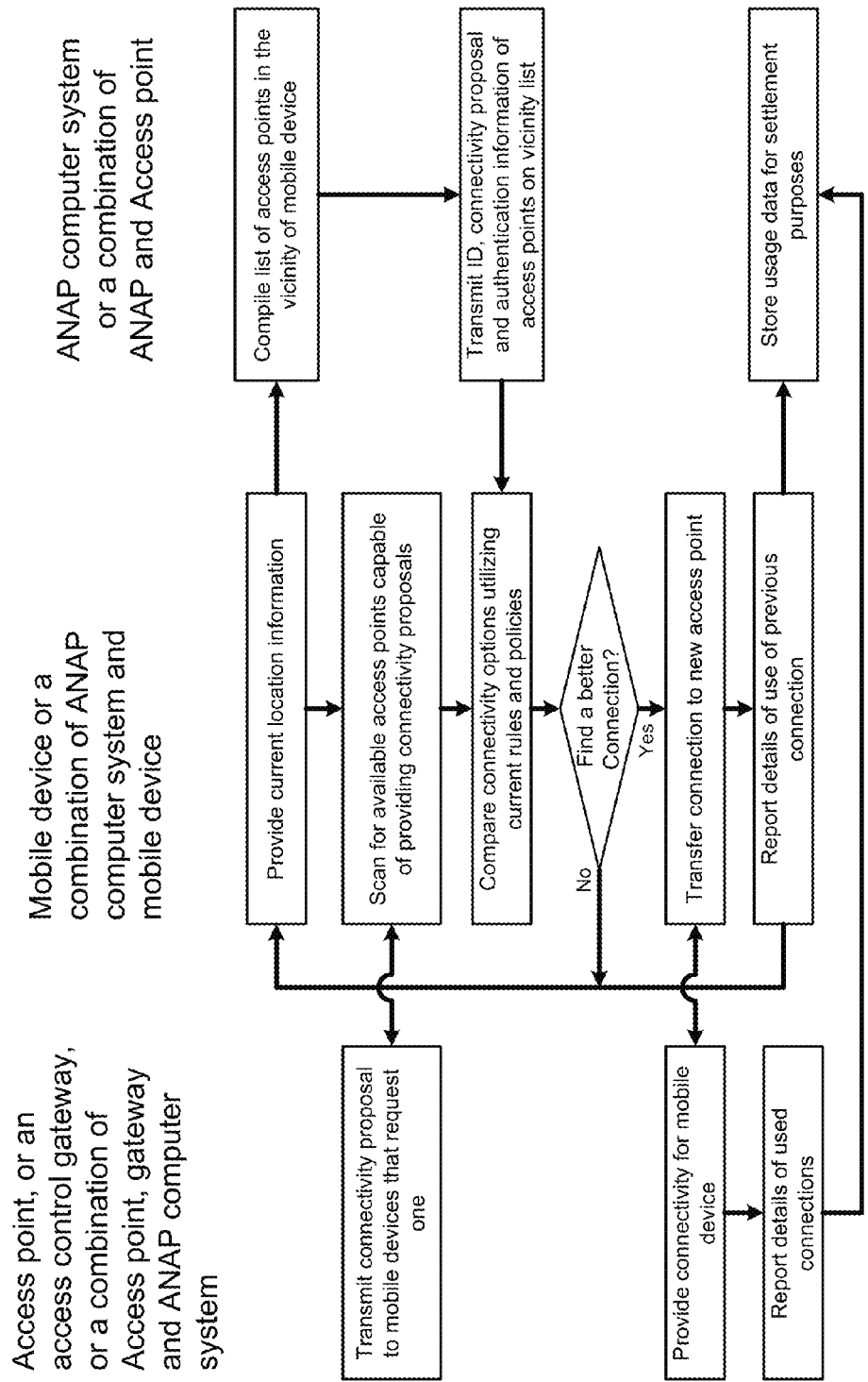
FIG. 4 is a flow chart of an example process of maintaining connectivity in an environment where information for connectivity may be provided by access points and non-access points.

The access point may store the Ts&Cs and other information and provide them directly over the wireless link to the selection engine of each mobile device that is requesting to receive them. This could be done using the 802.11u standard if both devices are capable of using this protocol. It may be that a multi-round two-way negotiation (or an auction) about the Ts&Cs is automatically carried out between devices. In this case the access point may be offering a price, the device could counter with a lower price and the policies in the AP may enable it to offer another price based on the counter offer and so on. The process of maintaining connectivity in an environment where some access points have internal proposal engines and others rely on proposal engines at alternative network access provider is illustrated in FIG. 4.

The Ts&Cs may have short periods of validity and connectivity may be re-negotiated at specific intervals as situations in terms of needs and available capacity will constantly vary. In case the proposal engine for the access point is implemented at the alternative network access provider the validity periods will be automatically downloaded to the mobile device together with the other terms and conditions by the selection engine. In case both the selection engine and the proposal engine may be hosted on servers of the alternative network access provider the information about the Ts&Cs and their validity periods is made available to both within the computer system environment. In some implementations, the alternative network access provider system can instruct a mobile device to immediately terminate a connection with an access point and can temporarily or permanently block the mobile device from that access point.

The level of sophistication in the terms and conditions may vary between implementations but in one implementation (embodiment) the following factors or access conditions include:

price of using the connection. This may vary according to time of day or the day of the month or year and may depend on other variables some of which may be quite dynamic such as current demand from other selection engines.

level of security available historical data about available bandwidth (throughput), packet loss, stability, jitter and other parameters of the connection (the selection engine may use this data but may have the mobile device conduct its own tests to determine the bandwidth and other parameters for the bandwidth such as jitter, packet delays of retransmissions during the connection to make its own determination about the quality of the connection.)

information about special promotions or sponsorship for the connection. For example some connections may be sponsored by advertisers. In this case the nature of the products being advertised and the frequency and obtrusiveness of the advertisements needs to be communicated to the selection engine for good decision-making. For example some end users may be interested in advertisements of topics that are close to their heart but may not accept advertisements of other topics.

Special instructions from the network operator and/or the mobile device user. For example it may be possible that the primary access network provider has agreed to a certain daily, weekly or monthly price for providing load-balancing services for specific primary access network nodes. The price may depend on the specific primary access node identifier, which is communicated by the mobile devices in conjunction with each scan. The node-specific price may vary over time and may depend on how much capacity is needed to provide the load-balancing service or on how long time a specific node has been using the load-balancing service. Several alternative ways of managing load and providing such services for specific primary access nodes (or cell sectors) were described earlier in the explanation of selection engines. In one embodiment in these cases the ANAP system, through using the selection engines special instruction feature, provides the necessary alternative network access capacity to respond to real time requests from a network management system of the primary access provider received through an API. In another embodiment the primary access provider has specified for certain primary access network nodes capacity limits in terms of connected mobile devices or in aggregate network load or has specified certain numbers of devices or aggregate communication rates to be transferred to alternative network access. In case the price is determined this way, there may be a varying cost per megabyte, for example, for the capacity that is actually supplied in order to meet the needs of the primary access provider. However, the ANAP system can use the special instruction system and the functions of the selection engine and accounting engine to allocate the costs and provide the load-balancing services.

Other information pertaining to the terms and conditions of using the access point may be relevant. For example some access points may belong to a network of hotspots controlled by a wireless operator or wireless ISP that offers fixed fee or other special pricing to subscribers of their services. In case the mobile device is a subscriber to the network the terms and conditions would normally be stored in the selection engine and the hotspot access point would provide information identifying it belongs to the group (for example in its SSID). Alternatively information about the AP belonging to a specific group of wireless ISP hotspots and its impact to the cost of using it can be communicated through the proposal engine just like for other access points.

There may be special information transmitted by the mobile carrier's own network. For example the desirability from the carrier's point of view to transfer the connection to an available Wi-Fi access point may depend on the load on the tower or cell to which the device is connected to. To manage the connections in an optimal way the carrier's proposal engine may instruct the selection engine in a wireless device at a particular time to seek the lowest price alternative even when the tower or cell connection would be available, if the load on the tower or cell connection is high. The mechanisms for this situation in certain embodiments have been described above in conjunction with explaining the selection and the proposal engines.

Other parameters affecting the Ts&Cs provided by the proposal engine were also illustrated above in the section about which parameters may be used by the selection engine to select the connection.

Whether all of these factors are included in the decision-making about the connection will depend on the level of sophistication on the proposal and selection engines. For example, it is possible that the selection engine is capable of selecting based on signal strength and price. However, more sophisticated decisions are possible by providing more information and alternatives in the terms and conditions by the proposal engine and increasing the capabilities in the selection engine.

Regardless of what level of sophistication is used in the decision-making, each mobile device participating in the alternative network access provider system will use connections through different access points at different times. In order to keep track of the actual use of each connection and to provide information for compensation and settlements each mobile device has an accounting engine. Many of the access points may use either an embedded or a cloud-based accounting engine to track the capacity that it has provided to various mobile devices.

In one embodiment, the accounting engine may use the RADIUS standard, WRIX (Wireless Roaming Intermediary Exchange) or another standard for access authorization and accounting to report and keep track of usage by the mobile devices.

Accounting Engine

The accounting engine collects and provides the data for the micro-commerce in bandwidth which is used to reward and incentivize all the participants in the ecosystem. The accounting engine keeps track of the capacity utilized by the mobile device through each of the connections that are enabled by the alternative network access provider as well as the specific terms and conditions and the clearing price established between the proposal and the selection engine for each specific use of the connectivity.

As a minimum condition for operating in the alternative network access provider system, for example, each mobile device needs to have an accounting engine or be covered by an accounting engine that is implemented on a gateway server connected to the access point. In another implementation (embodiment) the accounting engine is implemented in the mobile device or as a split implementation with one part being implemented in the mobile device for reporting the usage and another part being implemented on a server computer at the alternative network access provider. In this case the accounting engine receives the usage reports from the mobile device and/or the access point or gateway server. At least in a part of the connections the accounting engine receives a usage report both from the mobile device and from the access point or gateway server. This provides an opportunity to audit the reports coming from the mobile devices to make sure that the actual usage is reported correctly. In one implementation (embodiment) the transmissions from the mobile to alternative network access provider use an authentication and digital signature mechanism described below in the section about authentication and security.

To the extent the capability is available in the access points they may include an accounting engine that can collect information about usage of data capacity by each mobile device. If such records are collected and made available to the alternative network access provider they may be recompiled and used to verify the usage records provided by the accounting engines in the mobile devices. In one implementation the system of the alternative network access provider automatically logs into the administrator's interface of the registered access points (using credentials provided by the access point owners during initial registration with the alternative network access provider) in order to retrieve information about usage of connectivity by various mobile devices. This capability and function may be utilized in a subset of access points; however, even so it provides a very useful auditing function to control that the reporting by the mobile devices is accurate.

Alternative Network Access Provider

The alternative network access provider manages all the information to enable the micro-commerce between owners of access points, the ISPs, wireless operators and possible the end-users of mobile devices. The exchange further manages the billing and payments between all parties (see FIG. 1B). In one embodiment, the alternative network access provider is implemented as modules on a server.

Managing Terms and Conditions

Initially when an access point is added to the alternative network access provider it's SSID and other identifying information such as the BSSID, MAC address, unique identifier, etc. are registered with the exchange.

Note that many access points can have dual SSIDs and may establish priorities for traffic in each identity. This way a home user can dictate that any traffic routed to the homeowners own devices will have priority and only excess capacity in the connection is made available for commerce through the alternative network access provider. In other cases people can set up separate access points connected to the Ethernet ports of their home gateways and register these for the alternative network access provider. In yet other implementations the systems have provisions and policies to allocate different priorities for traffic with different client devices. In these cases the access point owners may either manually select high priority devices or the system may be programmed to automatically give higher priority to devices with high signal strengths and frequent long term connections (presumably devices that belong to the owners of the access points).

If the access point or gateway has the capability of transmitting its price and other proposal information directly to connected devices (for example by utilizing the 802.11u protocol) then that may be the preferred mechanism of automatically negotiating commerce on connectivity. Alternatively the access point owner can store terms and conditions at the alternative network access provider linked to its specific BSSID, MAC address, unique identifier, etc. and other identifying information. In this alternative the selection engine will get the terms and conditions from the alternative network access provider. As explained in the section about proposal engine, the alternative network access provider can be proactive and download the SSID's, authentication information and Ts&Cs for using the connection automatically to the mobile device for all the alternative network access provider registered access points that are in the vicinity of the mobile device at any given time. The location of the mobile device can be made available to the alternative network access provider either by transmitting the GPS coordinates of the device or by transmitting information about access points in range of the mobile device or by well known network based triangulation methods. The alternative network access provider can correlate this information to a database about location coordinates of access points.

Managing Usage Records

The second large set of information that the alternative network access provider manages is the usage records. As selection engines make decisions about which connections to use for various applications, the wireless device will transmit and receive data using different access points at different times.

The actual usage gets recorded by the accounting engine and detailed information about the use is transmitted to the alternative network access provider. Usage data may include, for example, the amount of data transmitted and received, which can be broken down by time of use, the application that transmits and received data, etc. At least in cases where the mobile wireless device received the proposal engine information directly from the access point, the terms and conditions and clearing price in force at the time of the usage may get recorded by the accounting engine. As explained above, the alternative network access provider may get usage information from the access points or access control gateways that may be connected to multiple access points. This may be used for billing and for verifying the correctness of information from the mobile devices. One implementation of obtaining this information through the administration interface was described above in the section about accounting engine. In another implementation usage information may be available from gateway servers in the network of access points. Such servers may be operated for example by wireless ISPs or operators of enterprise networks. The usage information for each subscriber and for each access point is then compiled in different ways and used as the basis for settling the compensation for using the bandwidth with all the parties involved.

The communication between the accounting engine and the alternative network access provider may use any protocols or standards (e.g., the RADIUS standard).

Providing Billing and Payment Services to all Parties

Depending on the agreements between various parties the bandwidth or data transmission services may be sold by the alternative network access provider to the wireless operators who in turn will bill their customers for its use in accordance with their subscription agreements with each customer. As described above many other possible buyers of connectivity services may also be involved.

Alternatively the alternative network access provider may establish direct relationships with the end-users of mobile devices and sell the alternative network access provider capacity directly to the end-users. This may be through fixed-price or per use or other creative commercial arrangements using prepaid, postpaid or barter agreements (for example the owners of access points usually are the owners of mobile devices and may receive some or all of their mobile use of the alternative network access provider bandwidth in exchange of making their access point's bandwidth available for other mobile devises registered with the alternative network access provider).

Third-party aggregators can create agreements with end users of wireless mobile devices (or with owners of access points) and negotiate "wholesale" terms with the alternative network access provider. Regardless of how the selling of bandwidth is organized, there are, on the other side of the commerce transactions, the providers of the data transmission capability, the owners of the access points. The alternative network access provider uses the information provided by the accounting engines for settling the accounts with the bandwidth providers. Which may be the hotspot providers (or WISPs) or new kinds of ISP's, in some cases operating together with individual access point owners or various aggregators of Wi-Fi capacity. The same accounting engine data, this time aggregated by the ISPs, can be used for providing an appropriate and agreed compensation to the ISPs.

In practical terms any compensation to the individual homeowners who have registered their access points in the alternative network access provider may be provided through their ISPs. In this alternative (embodiment) the payments received from the alternative network access provider will be applied to the invoice that the ISP would be sending to the owner of access point for the ISP's service. Often the ISP provides a bundle of services including telephony, and television services. Therefore the total bill may be large enough so that this compensation mechanism can be used even for access point owners that have great deal of the alternative network access provider traffic flowing through their connection.

One more set of participants in the commerce is the sponsors of connectivity. Through agreements with hotspot owner organizations, or even individual access point owners, various companies may offer to pay for bandwidth in return for ability to provide advertisements or commercial messages to the end-users. As mentioned in the section about proposal engine, other forms of compensation by the end-users may be used. It may be possible that the use of bandwidth is sponsored for accessing specific websites or other services. For example access to sites that offer specific products for sale may be sponsored by the owners of the sites. In these cases the alternative network access provider will provide billing to and collect payments from the sponsors for the usage of the sponsored bandwidth.

Figure 5:
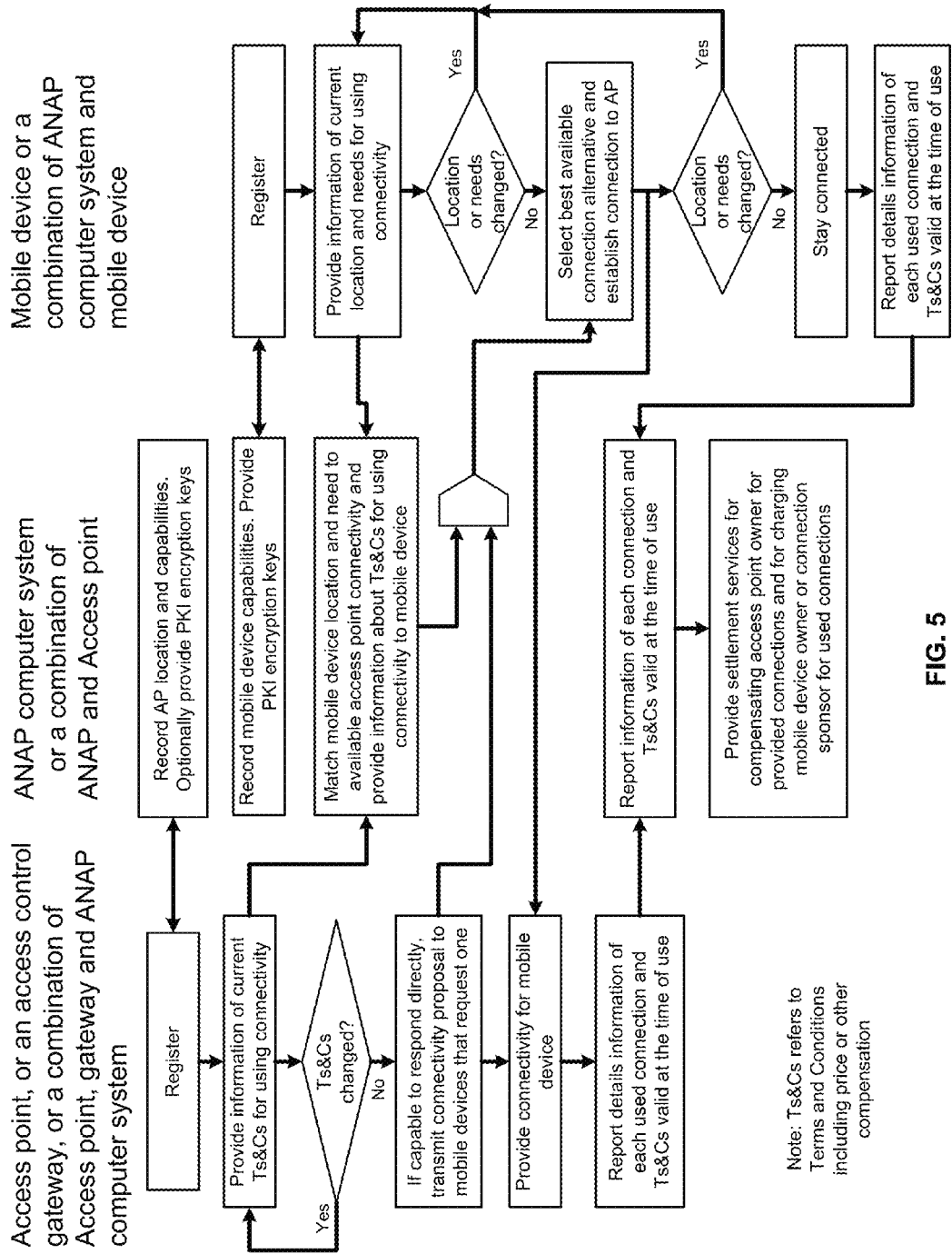
FIG. 5 is a data and process flow diagram of an example implementation of system for providing alternative network access.

FIG. 5 is a data and process flow diagram of an example implementation of alternative network access provider.

The alternative network access provider enables local micro-commerce in connectivity and data transfer capacity by making information available to potential buyers (users of wireless mobile devices) from potential sellers (owners of access points) and by executing the micro-commerce transactions. In the process the alternative network access provider will accrue detailed information about the need, acceptable pricing and availability of connectivity and data transfer capacity in different locations and at different times. There are several ways of charging for the service produced by the alternative network access provider. Some preferred alternatives are listed in the following.

Figure 6A:
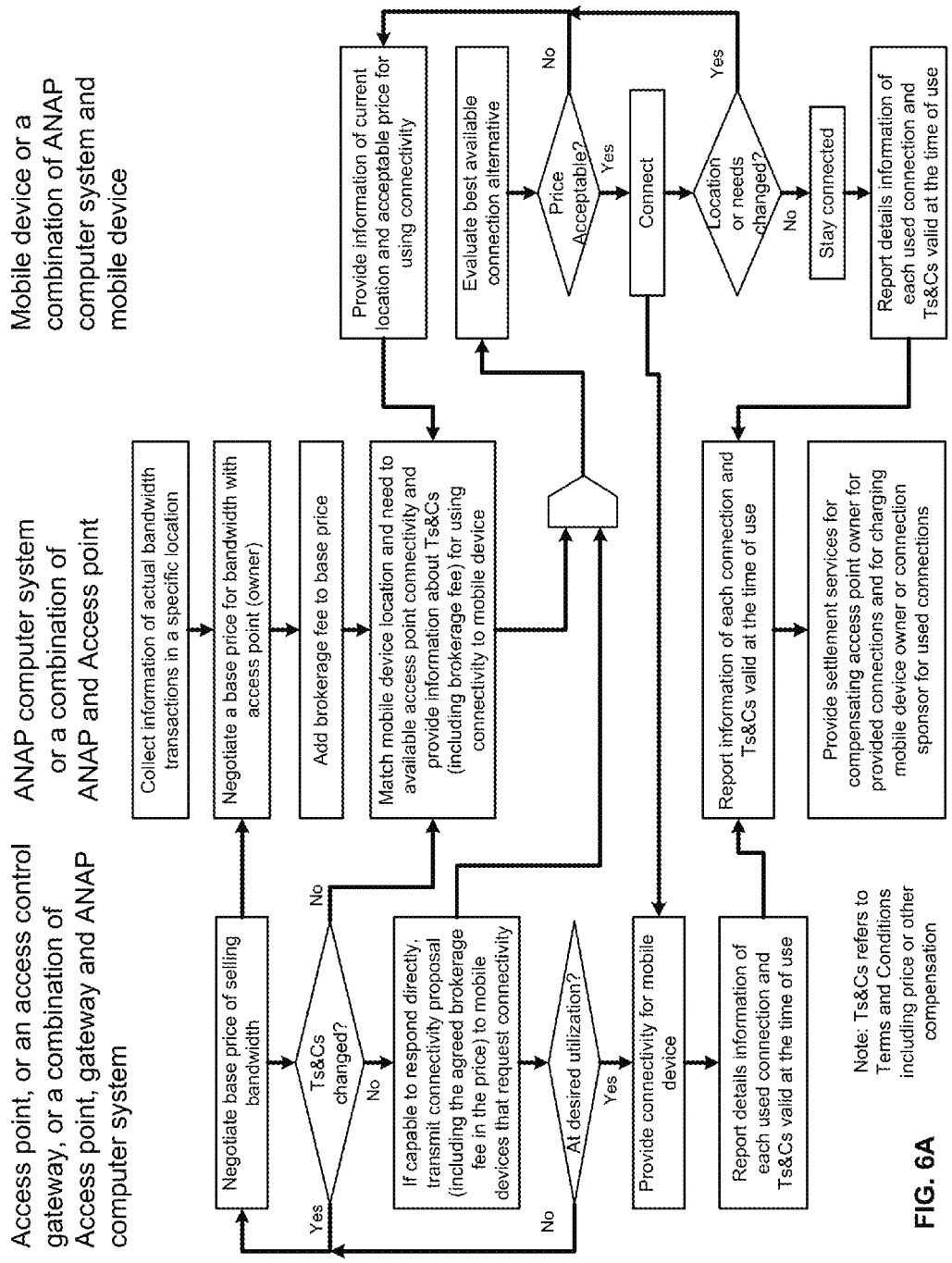
FIG. 6A is a data and process flow diagrams of other example implementations of system for providing alternative network access.
Figure 6B:
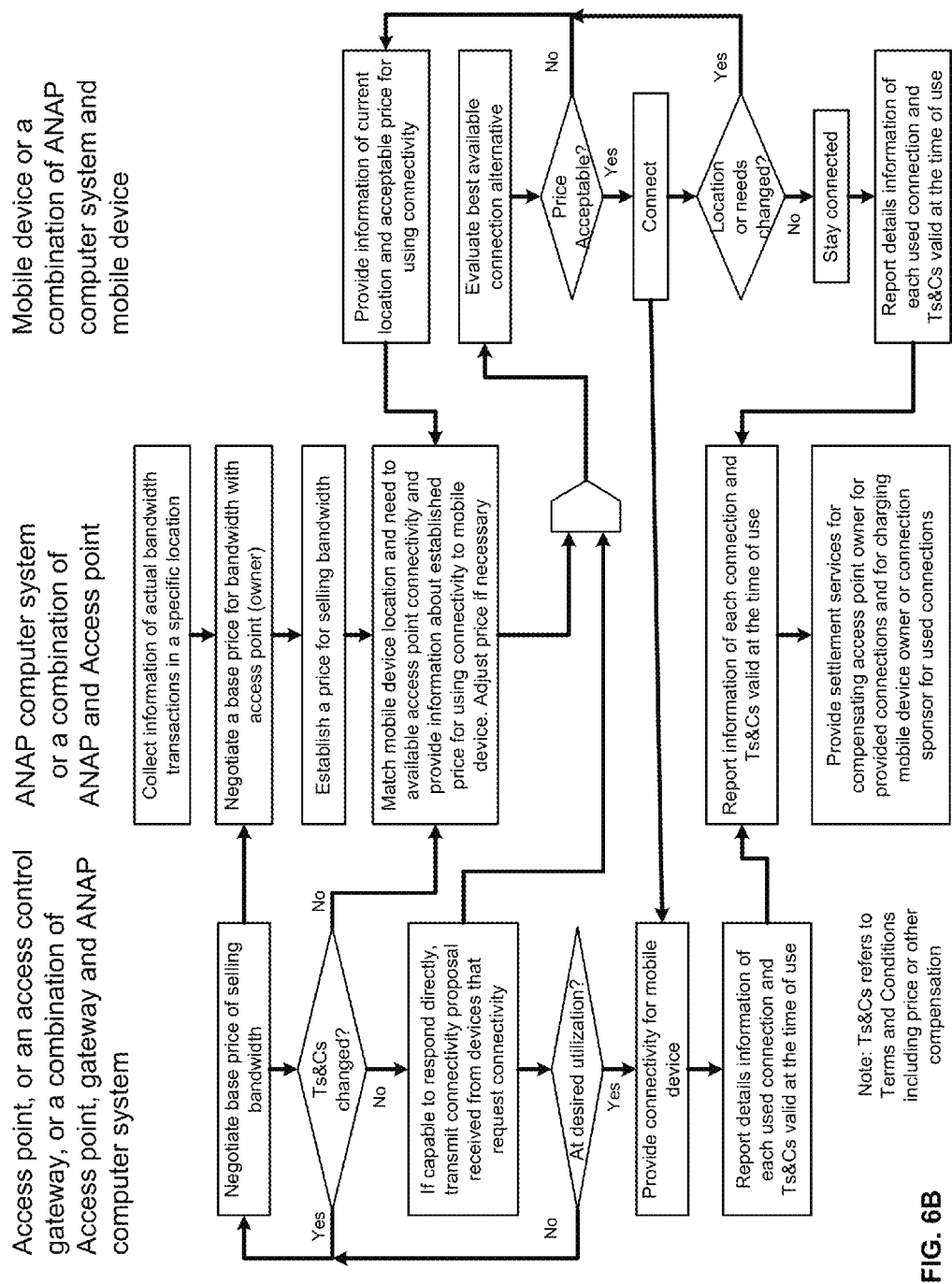
FIG. 6B is another data and process flow diagrams of other example implementations of system for providing alternative network access.

- a brokerage fee arrangement charges a percentage of the value of each transaction mediated through the exchange. In this case one possibility is to include the brokerage fee in the price offered in the Ts&Cs of the connectivity proposal. The overall process for utilizing the alternative network access provider in a brokerage mode is illustrated in FIG. 6A.
- an intermediary market maker business is based on the alternative network access provider and negotiating terms and conditions with access point owners (with or without minimum purchases) and then selling the bandwidth to owners of mobile devices on its own account at a price him that mobile device owners are willing to accept. The overall process for utilizing the alternative network access provider in an intermediary mode is illustrated in FIG. 6B.
- membership fee may be charged for each participant in the marketplace.
- information about the marketplace needs and activities in different localities may be sold to market participants and their infrastructure providers.
- the alternative network access provider may facilitate participation of new sellers and buyers in the market by establishing and communicating local price levels.
- the alternative network access provider may create or trade in or enable other market participants to create, buy or sell sophisticated contracts including guaranteed minimum bandwidth, duration of the arrangement, characteristics of the bandwidth, for example reliability, jitter and packet loss.
- the alternative network access provider may create or trade in or enable other market participants to create, buy or sell futures contracts on bandwidth in specific locations. For example providing bandwidth during meetings, events, and/or conventions in specific locations may offer an opportunity to sell it at higher prices.

Resource Pooling Through the Alternative Network Access Provider

The functions of the alternative network access provider have been described as they would be used for the purpose of providing connectivity and capacity to wireless devices through essentially stationary access points with wired connections through ISPs. However, the same system can be used in utilizing connections that are transmitted via other mobile devices. In this scenario each of the mobile devices includes a proposal engine and can offer to transmit a connection in essence acting as a mobile access point. The network connection for this mobile access point can in this scenario be provided by the network operator through its infrastructure or it can be routed through the Wi-Fi access point, for example utilizing the alternative network access provider mechanism as described above in cases where more than one Wi-Fi radio system and frequency channel are available in the device. This use of the alternative network access provider for pooling wireless connections is illustrated in FIGS. 2A-2B.

There are already on the market solutions in which mobile smart phones act as Wi-Fi access points for other devices. What is added to this mechanism are the functions that make it possible for any device to support other devices in this fashion and get compensated for this service in accordance with terms and conditions negotiated between the devices or though the alternative network access provider with real time pricing based on the alternative network access provider functions. The alternative network access provider can be implemented to handle the compensation and settlements between the devices.

There are a rapidly growing number of Machine to Machine (M2M) wireless modules deployed for purposes of providing asset tracking and monitoring services. These systems may be using a fraction of the capacity of the connection. Adding Wi-Fi function and registering the devices in the alternative network access provider could in many cases turn them into revenue sources.

In addition, the connection can be transmitted through several wireless devices forming a mesh network. Again the alternative network access provider mechanism for accounting for the usage and providing payments to participants would be the commercially enabling new dimension to previously proposed mesh network systems.

The benefits derived from transmitting connections between mobile devices include providing further connectivity in areas that otherwise would not have sufficient capacity. However, a more frequent and important benefit is pooling the data connectivity resources of several devices using the "peer to peer" wireless connectivity. Much of the usage of the web may include intermittent downloading (of new files, songs, webpages or images) and this activity between different devices may be asynchronous. Therefore pooling the connectivity resources will in effect increase the speed in the user experience of all participants in the connectivity pool. All the various radio resources (Wi-Fi, Bluetooth and other radio systems) on each device can be utilized in establishing connections between mobile devices and connections to the Internet. Again the enabling systems and methods for obtaining these benefits are the alternative network access provider functionality as explained above.

The connection pooling provides a barter trading opportunity. Since the same devices participating in the connection pooling will be providing connectivity as well as utilizing connectivity provided by others the net cost for each participant may be positive or negative depending on the usage patterns.

This same resource pooling method applies to pooling between stationary access points as well. At the current time in most cases local area wireless network speeds are many times higher than wide area network connectivity through cable modem, DSL or even fiber connections. In cases where there are multiple radios in each access point, similar peer to peer connectivity can provide access to several simultaneous wide area network connections. Situations with at least two wireless radios per access point are becoming more common as dual band (2.4 and 5 GHz) access points will gradually gain a higher share of the installed base. Again, the microcommerce system of the alternative network access provider can handle the enabling of access point resource pooling and the appropriate compensation to each participant in the pool. The observations about intermittent downloading and benefits to user experience of all participants apply to this stationary case as it did for the mobile case. In practice resource pooling can include both mobile and stationary devices operating in a mixed mode pooling configuration.

Authentication, Security and Gateway Connections

There may be two or more nested levels of access in a Wi-Fi implementation for accessing the internet through the alternative network access provider: one deals with the wireless access to the access point itself and the other controls the access to the Internet. Using encryption and password access to secure the connection to the access point is optional in the alternative network access provider system. The more important aspect for the alternative network access provider functions is the authentication, authorization, access control and usage measurement and recording (accounting) of access and data traffic to the internet or possibly to the Mobile Operator's core service system. Similar systems of authentication and access control can be used at both levels of access.

In some implementations, access control and accounting functions may be managed using one or more other methods (e.g., Extended Authentication Protocol (EAP), Wireless Internet Provider roaming (WISPr), and the like). An example implementation of an access control mechanism used in authenticating access to alternative network access points is described in FIG. 6E.

In one implementation when initially registering with the alternative network access provider, each mobile device establishes a public/private key in a standard PKI infrastructure system or establishes a shared secret between the mobile device-resident portion of the ANAP system and the cloud based part of the ANAP system. In the PKI solution the private key resides in the mobile device and is used to authenticate the device to obtain information about connecting to the alternative network access provider enabled access points. In a similar fashion the usage records can be encrypted using the private key of the mobile device and a digest of them can be added, encrypted using the public key of the alternative network access provider, to make sure that they have not been altered during the transmission and storage. For access points that are capable of handling similar security functions, a corresponding public/private key combination may be established when they register for the alternative network access provider.

The security aspect for the access control information for the wireless connection specifically can be handled, for example, in the following way: in cases where the Ts&Cs of the proposal engine are obtained from the alternative network access provider it is possible to control security by transmitting the access point authentication password to the participating mobile device encrypted with its public key after the device has signaled acceptance of the Ts&Cs for using the connection through the particular access point.

In one implementation the alternative network access provider changes the password or access credentials of participating access points at specific intervals and coordinates these changes with all of the authorized devices including the client devices of the access point owner and the devices to which access is provided through the alternative network access provider commerce arrangement. In this solution each access point owner registers all of the authorized client devices with the alternative network access provider so they can participate in this continuous password change process.

In another implementation the sequence of future passwords is generated using an algorithm that is made available to all authorized devices (devices of the access point owner) which algorithm may be time based and use tables of randomly generated passwords. The alternative network access provider has the same synchronized password generation system so it can provide passwords to the devices that it is enabling as a result of an alternative network access provider commerce transaction.

In yet another implementation the alternative network access provider provides limited connectivity to all devices through the access point to an authentication server that can automatically provide access to devices pre-authorized by the access point owner or to devices that can input a password. The same authentication server can then be used to manage access for devices that are utilizing the alternative network access provider to gain access through the commerce transactions.

One implementation of security provides for dual SSID and security arrangements at the participating access points. This way the owners' devices can continue to use their familiar log on functionality and the alternative network access provider enabled devices will use the secondary SSID and security system.

Figure 1C:
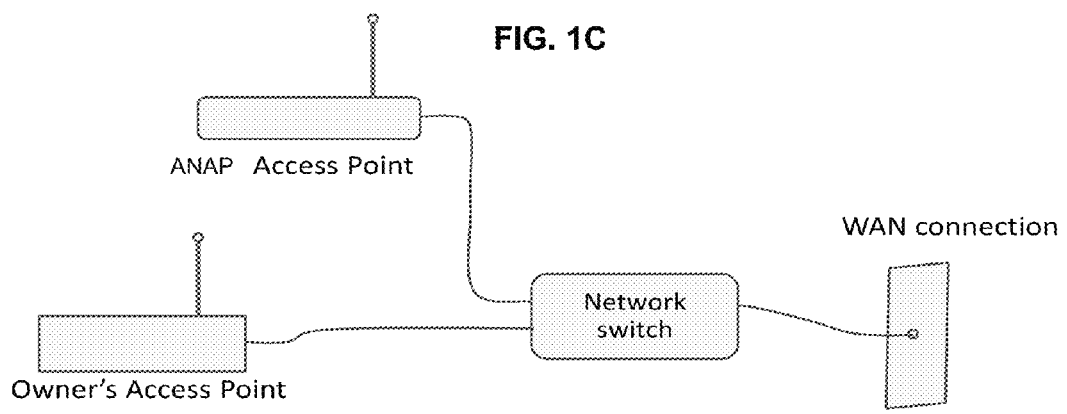
FIG. 1C is a functional block diagram of an example of an access point configuration.
Figure 1D:
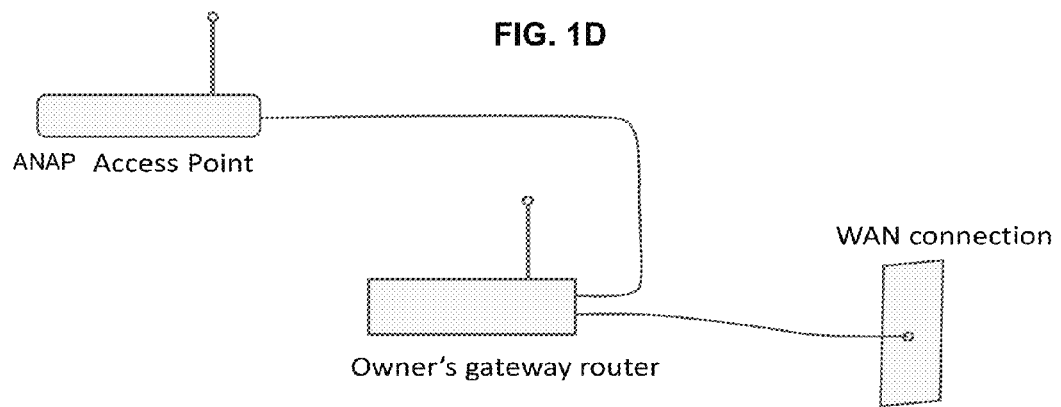
FIG. 1D is a function block diagram of an alternative example of an access point configuration.

FIG. 1C-D show example access point configurations. In a hardware-oriented security implementation, the alternative network access provider-registered access point is a separate device provided to the owner/user of a wired Internet connection. This device has the proposal engine or a reference to it and is registered with the alternative network access provider. Depending on the owner's equipment and preference there are different ways to connect the device to the Wide Area Network. These provide a way to maintain the security arrangements of the owner's original access point and minimize (perceived) security issues. For example the two access points may be connected to the WAN through a network switch or the alternative network access provider access point may be connected to a secondary Ethernet port of an internet gateway/router device.

It is not the purpose of this description to address the details of authentication, IP tunneling, access to operators' premium services and other issues related to security of the data transmitted through alternative network access provider connections. As mentioned in the introductory section, there are already quite advanced solutions described in the 3GPP standards and several vendors are offering solutions for the technical aspects of authentication and security related issues and those are used in various embodiments.

Figure 1E:
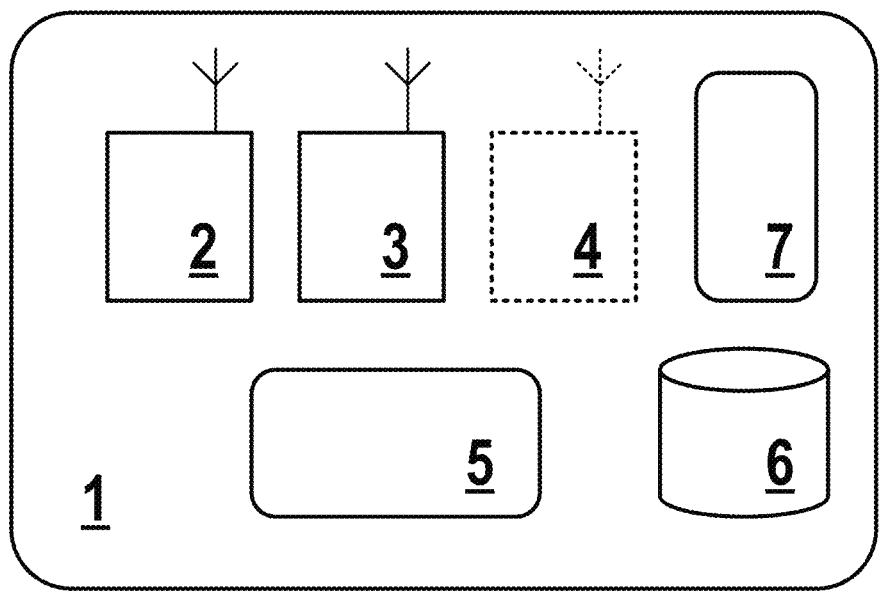
FIG. 1E is a functional block diagram of a wireless mobile device.

FIG. 1E is a block diagram of an example wireless mobile device. The wireless device includes two or more wireless radio systems with their associated antennas (2, 3, 4, FIG. 1E). The device includes, for example, a processor (5) capable of executing applications and of controlling the status of the radio systems and storage or memory (6) for storing and retrieving data and programs for applications. Further the device has a user interface (7) which allows a user of the device to interact with applications and to control various functions of the device. For example, the user may use the interface to turn on and off the various radio systems or he may use it to make the selection that a software application described in this document shall control the state of the radio systems.

Various applications executing in the processor may have communications needs and they would use the radio systems to satisfy them. This election of which radio system is used for communication is often made by the processor. In many cases wireless devices have been programmed by the manufacturer to utilize a particular radio system, for example the Wi-Fi radio, for data communication needs if a connection to the Internet can be established through the system.

In order for the wireless device to utilize a particular radio system the specific radio system needs to be turned on. The radio system can either be turned on and off by the user through the user interface (7) or be automatically turned on and off by the device by executing an application in the processor that controls the state of the radio.

Once the radio system is on, it can attempt to connect to the Internet or to the telephone network over the various radio systems. In some cases the network system will require authentication, for example a password in order to allow the connection to go through.

In the following sections various methods to automatically manage the state of the radio systems and the selection of the specific connection for communication are described.

Managing the State of the Radio Systems Based on Data Communication Need or Speed The following paragraphs in this section assume that the user of the device has made the selection to let a software application manage the state of the radio systems.

For clarity the following examples are written to illustrate the management of the Wi-Fi radio system. However, it should be understood that the same mechanisms and principles can be used to manage the stage of any other radio system as well.

In many wireless devices it is customary to have the cellular radio system on all the time whether it is 2G, 3G, or 4G radio, or a packet-based LTE radio. This system handles the communication with the mobile service provider including voice calls and text messages. If there is no other radio systems available the cellular radio system handles any data communication that the device may require. However, in many cases the data communication is automatically switched over to the Wi-Fi system if a connection to the Internet or other backend system is available through the Wi-Fi radio. This is because in most cases it is less costly and uses less battery power to send the data communications over the Wi-Fi system. Some mobile devices may be equipped with a Wi-Fi radio that is able to communicate with two or more access points (e.g., using different Wi-Fi protocols).

In one embodiment of the solution an application running on the processor of the wireless device periodically checks the amount of data that is being transferred, or needs to be transferred, through the radio systems. If the amount of data transmitted over a particular time interval exceeds a predetermined value the application turns on the Wi-Fi radio. Stated in a different way: if the speed of data transmissions exceeds a predetermined threshold, the system turns on the Wi-Fi radio.

Always when the Wi-Fi radio is turned on it will scan the environment to see what, if any, Wi-Fi access points are available and whether they require a password or other credentials for a connection. If there is an available access point or several access points the device will connect to one of them if the device has information of any passwords that may be required for a connection.

Connecting to the Wi-Fi access point may not mean that there is a connection to the Internet. The device checks whether the connection is available, for example by requesting a specific website to provide a response and then comparing the received response to a stored copy of the expected response. This way the system can determine whether any access control gateway has redirected to a connection to a page that may require input of credentials.

The device, in one embodiment, continues to monitor data traffic in the communication system and if it detects that the speed of the traffic falls below a certain predetermined threshold for a predetermined time it will turn off the Wi-Fi radio. In another embodiment the device would leave the Wi-Fi radio on as long as the device maintains a connection with the access point and the signal strength, or the signal-to-noise ratio in the connection to the Wi-Fi access point stays above a predetermined threshold. If the connection signal strength or other quality indicator falls below a predetermined value the device will disconnect and turn off the Wi-Fi radio.

In another embodiment the device processor keeps track of the active applications running in the device and as soon as an application that has significant communication needs is activated, the system will automatically turn on the Wi-Fi radio. This initiates another scan of the environment and, as explained above, possibly a connection through the Wi-Fi access point. A list of applications that may have significant communication needs is in this case stored in the device's memory (6). For example, the list can be preconfigured by a user or can be determined automatically over time by monitoring the data usage and patterns of use of various applications.

Another indication of possible data communication needs is the overall state of the device and the state of its display. In order to conserve battery power the devices automatically go into a "sleep" mode, in which the display may be turned off, and any other processes and device may be suspended. During these times the system may turn their Wi-Fi radio off and adjust the so-called wake-up interval as explained later in this description.

Managing the Radio Systems Based on Data Communication Locations

In addition to keeping track of the data communication speeds and the applications that may have data communication needs the device processor may use the observed current and a set of previous locations of the device for making the decision about turning on the radio.

While there are proposed solutions in which the user of the device may program various locations into the memory and the system will then turn on Wi-Fi radio in these locations these systems are cumbersome and require significant effort by the user to input information about selecting locations where to turn on the Wi-Fi radio and the locations would need to be manually updated as the use patterns and availability of wireless networks in various locations changes.

In one embodiment of the solution the wireless device stores in the memory (6) the location of use of data communication, the radio system used for the data communication and the total amount of data in each communication session, the time of the session as well as the application using data communications. This information is then used to let the device learn the locations where significant data communication takes place and where a Wi-Fi radio connection (or any other particular radio system) is used for this communication. In one embodiment the system rank orders the locations based on data usage and possibly based on the percentage of successfully using Wi-Fi and uses the top locations in the ranking as a basis for turning on Wi-Fi or shortening the wake-up interval. The system may just automatically turn on the Wi-Fi radio whenever it detects the device is in a location or within a certain distance of the location where communication over the Wi-Fi radio system was previously successfully used.

In order to avoid the drain on the battery from using the GPS system the device may first try to establish its location based on triangulation or other method utilizing the cellular radio stations or access points for Wi-Fi or other radio systems that it detects during routine scans and operation. The frequency of the location checks and the method of checking the location may be selected based on past history of the frequency of data communications, time of day, day of week or other parameters characterizing previous data communications.

Sometimes the device may be in motion while the data use is going on, for example in a moving vehicle. In these cases the opportunity to utilize Wi-Fi connections may be limited because of the time required to establish a new connection and the shortness of the time any particular Wi-Fi access point would be available for the connection. To avoid unnecessary use of the Wi-Fi radio in these circumstances the wake up interval may be made longer or the Wi-Fi radio may be turned off if it is detected that the device is in motion.

Managing the Radio Systems Based on Time

In addition to data communication needs and observed locations of data communication, the solution uses time based methods for managing the Wi-Fi radio. There may be several inputs to selecting times when to turn on and off the Wi-Fi radio. As mentioned in the previous section, the times may be based on the pattern of observed behavior regarding data communications or may be based on user input.

While there are systems that provide the opportunity for the user to input a schedule for turning on and off their Wi-Fi radio, these methods provide a partial improvement compared to always having the radio on or always off. They may affect the actual state of the radio to turn it either on or off.

In this solution there is a mechanism through which the Wi-Fi radio is automatically periodically turned on. Upon turning on the radio the device performs a fairly rapid scan of the environment and determines whether there are any access points that are available for a connection. If there are, the system will associate and may remain associated until signal quality degradation may result in a disassociation. Upon disassociation the device will turn the Wi-Fi radio off. If there are not any access points through which the device can establish a Wi-Fi connection, it will automatically turn off the Wi-Fi radio for a set amount of time, which we will call "the wake-up interval".

In this solution the time based management system of the radio may not merely be turning on and off the radio at predetermined times but it may be affecting the length of the wake-up interval. For example during times of day and days a week that the device has had frequent and high-volume data communication the wake-up interval may be made shorter.

The wake-up interval may depend on the overall state of the wireless device and the state of its display. If the device is in so-called sleep mode the wake-up interval may be made longer. A status change from sleep mode to normal operating mode may trigger an immediate turning on the radio and a scan of the environment for Wi-Fi access points followed by a shorter wake-up interval in case no access points are found that can provide a Wi-Fi connection.

In Wi-Fi access point connections the signal strength and quality may depend on a number of factors including the distance to the access point, the way the user is holding the device and interference from other devices like microwave ovens. In these cases the availability of a connection may disappear for a short period of time and return as the circumstances change. For this reason, the solution, in one embodiment has a short wake-up interval for the first couple of tries after a disconnection and then changes over to a longer interval in accordance with the device situation data use and other parameters.

Some wireless devices allow the user to configure tasks and applications to execute when there is a Wi-Fi connection to the Internet or a backend system. For example uploading photographs from the device and synchronizing any podcasts or other content or performing software updates may be tasks that the user has configured to be carried out over a Wi-Fi connection. The wake-up interval may be determined so that it is likely that these tasks will get completed within the time expected by the user after he or she arrives at a location where Wi-Fi is available. Without a wake-up interval and time based Wi-Fi radio management these tasks might not get completed even though a Wi-Fi connection would be available. If the only mechanism for turning on the radio would be dependent on observed data communication speed the radio would not turn on since the applications will not start before it is on.

Managing the Radio Systems Based on the Performance Characteristics of all Radios In addition to the methods described above the automatic turning on and off various radio systems can be based on the performance characteristics of observed for the different systems. The metrics used to measure the performance may include the relative signal strengths, the automatically selected encoding rates for each radio communication alternative, the relative battery consumption of various radio systems or any other metric that is available to the processor. In this solution the system may perform periodic checks of the performance level for example by transferring said amounts of data over the radio connection to serve the data communication speed.

The system may be performing brief speed tests with various radio systems and have logic that determines that a certain available speed level in each of the radio systems will cause the connection to be switched over to that system. Other characteristics of relative performance may be measured and this may result in a more complex logic for selecting which radios to use and which ones to turn off and how long the wake-up intervals should be for the radios that have been turned off.

Managing the Radio Systems Based on Cost

In some embodiments of the solution the Wi-Fi radio or other radio systems may have predetermined or known costs associated with data communication over the radio link. For example this cost may be provided through an alternative network access provider enabler as described in U.S. provisional app. Ser. No. 61/618,318, filed Mar. 30, 2012, entitled "Systems And Methods For Alternative network access provider", and U.S. provisional app. Ser. No. 61/563,735, entitled "Method and System for Real Time Micro-Commerce in Wireless Connectivity," both of which are hereby incorporated by reference.

In case the cost of communication is known or can be determined, it can be used to select the communication link between different alternatives. These alternatives may include multiple Wi-Fi access points and cellular radio, WiMAX and other radio systems. In one embodiment of the solution the selection of the connection to be used is based on the cost and possibly by a policy provided by either the device owner or the communication service provider that is providing the cellular communication to the device and has a contract with the device owner.

In case a certain radio system is not selected for communication the system may automatically turn off the radio in order to save battery power and set the wake-up interval based on time location and history of communication.

Managing the Radio Systems Based on Combinations of Factors

The earlier sections of this application have described various factors that can be used in managing the state of the radio systems in a wireless device and in managing the selection of the specific communication link.

In additional embodiments of the solution, various combinations of all or some of the factors can be used to achieve optimum management of the radio resources with regard to battery power and cost. For example the wake-up interval can be set to be different at different times of the day and at different locations of the device and may depend on which applications are active in the device.

Similarly the wake-up interval may be made to depend on the past success in establishing a Wi-Fi connection in a particular location. For example, if the device has tried a few times to find an available access point for a Wi-Fi connection in a particular location and failed, the system may make the wake-up interval longer in that location to avoid unnecessary attempts. For example the wake-up interval for that location may be made to be a day or several days so that the system will catch a possible addition of a new access point that may be made available, but will not waste resources in trying to connect frequently in places where no connection has been available before. Access points may be available for a particular device because they do not have a password protection or access control gateways controlling access to the Internet, because the password has been stored in the memory of the wireless device or because they can be accessed through an alternative network access provider.

Similar, other, complex combinations of variables explained in the previous sections may be utilized to precisely tune the management of the state of the radios and connection selections to achieve the optimal battery savings and cost savings.

Ecosystem of Software and Component Providers

This description introduces a method and the system with the associated functional descriptions to implement embodiments. The systems and methods can provide the means to harness the enormous wireless capacity already installed in people's homes and in enterprises. In addition as a result of establishing the alternative network access provider, an entire ecosystem of access point, picocell and femtocell providers will take shape. Large numbers of these, relatively inexpensive devices, can be deployed and connected to the Internet and through the cloud-based service of alternative network access provider, their capacity can be connected directly into the ecosystem. Their owners and maintainers can be compensated through the alternative network access provider for the micro-transactions of providing bandwidth to wireless devices in their vicinity. However, in this ecosystem there will be many other participants as well. The central aspect of the alternative network access provider solution is that it provides a platform for large numbers of different kinds of participants to provide products and services that will enable the commerce.

By publishing the interfaces and APIs for communicating with the alternative network access provider for the purposes of providing terms and conditions for use, usage records and for automated payment transactions the managers of the alternative network access provider can make it possible for third-party companies to write applications for the selection engines and proposal engines for various kinds of mobile devices and access points. Alternatively the proposal and selection engines can be implemented on the alternative network access provider computer systems and the interfaces (APIs) provided to other ecosystem participants include specifying the method and format of providing the information described above that is needed for the proposal and selection engines to work and a format and method for providing the operator specified rules and policies.

The published APIs will make it possible for already established companies that provide solutions for secure gateways and for mobile devices for Wi-Fi offload to add the functionality of proposal, selection and accounting engines and the above explained secure routing of terms and conditions and usage data to the alternative network access provider cloud-based information system.

The published APIs will make it possible for different kinds of sponsor organizations to create applications for wireless devices to display their advertisements and collect survey results. Because of the local nature of access point connectivity the system will already know to a certain degree the location of the wireless device and its end-user so many advertisements can be local in nature and relate to products and services that are available in the vicinity of the end-user even in cases where the end user is not willing to provide precise location information from the wireless devices GPS system.

These enabling applications can be certified by the alternative network access provider and sold either through wired ISPs or directly to owners of access points and either directly or through wireless operators to the end-users of wireless devices.

There may be service providers and equipment manufacturers who can add new alternative network access provider based features into their existing offerings and thereby generate new revenue opportunities and increase the availability of mobile data capacity. Examples include:

municipal outdoor Wi-Fi service providers who can sell their excess capacity in retail through the alternative network access provider providers of satellite based Internet connectivity. In this case it would be effective to utilize the installed physical satellite receiver structures, which are already outside the buildings and may be in an elevated and visible location. Adding a high-powered outdoor Wi-Fi access point to these structures would provide a large coverage area around the satellite receiver location. To maximize the possibility of mobile device connections and the opportunity for micro-commerce in may be several access points with sectional highly directional antennas could be used in each structure.

Manufacturers of indoor access points may provide a combined client/access point device that can be placed on a windowsill in areas of high data connectivity need. This device would connect to the existing wireless access point as a client and project wireless signals as an access point outside the building.

Companies rolling out new 4G networks or operating WiMAX networks are today limited by lack of end-user mobile devices that are capable of directly connecting to these new networks. The alternative network access provider provides a mechanism for these companies to reach a much wider customer base immediately. By installing intermediary bridge devices that connect to the Internet using the new network technologies (like 4G, LTE or WiMAX) and on the other side provide simple local Wi-Fi connectivity that is made accessible through the alternative network access provider they can serve any Wi-Fi enabled devices.

Providers of M2M connectivity modules or services may use a small fraction of the capacity for simple asset tracking or monitoring can add a Wi-Fi module and get paid for their M2M functionality by selling the excess capacity through the alternative network access provider.

As radios continue to become less expensive and more and more radios can be integrated into a single chip SOCs, the opportunities increase for creating completely new products that are specifically designed to provide data connectivity services and rely on the alternative network access provider to handle the commercial aspects of their utilization.

Figure 6C:
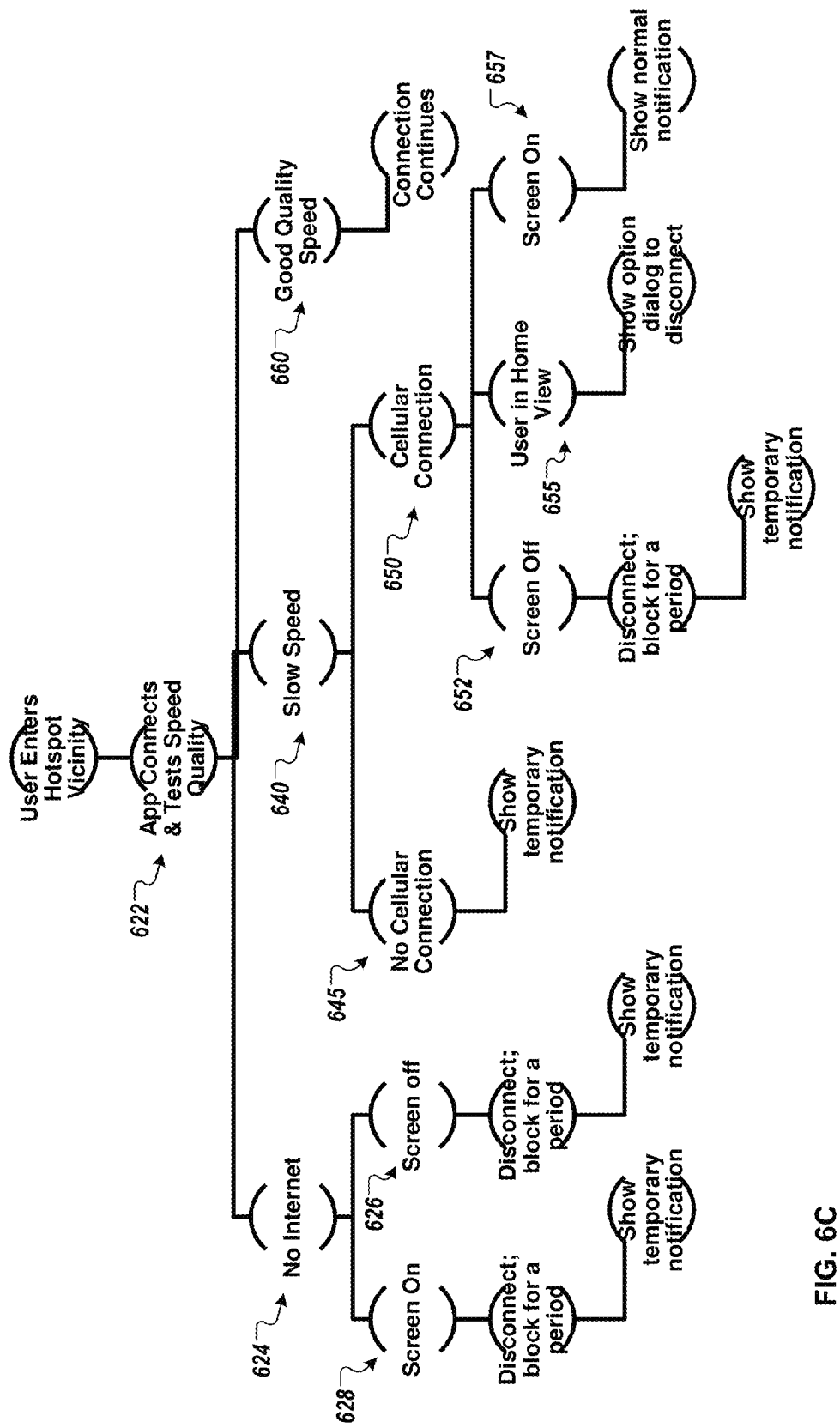
FIG. 6C shows various example access management processes.
Figure 6D:
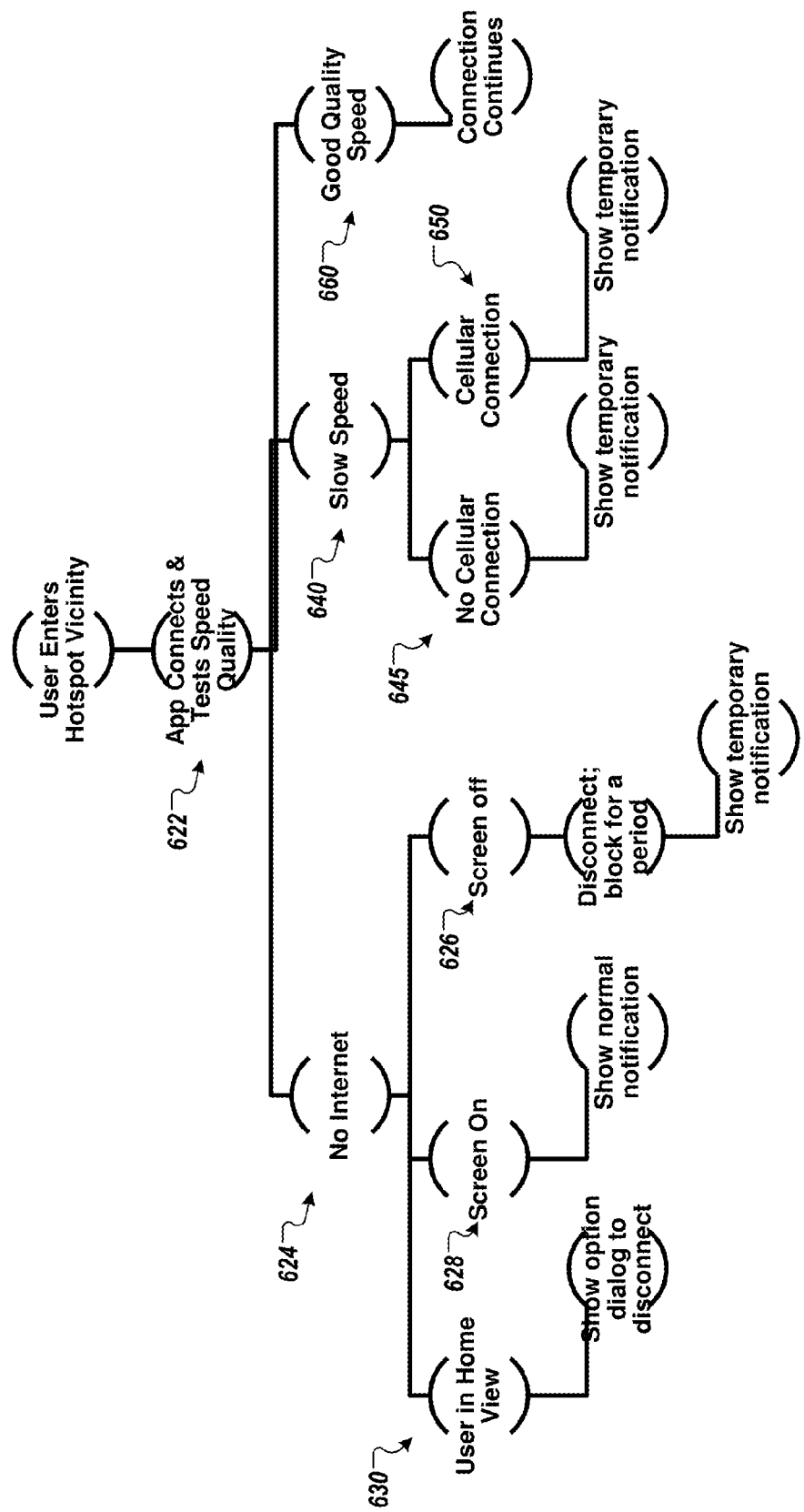
FIG. 6D shows additional example access management processes.

FIGS. 6C-D show various example access management processes illustrated with nodes in a tree form. For example, a user using ANAP provided access points may experience the processes shown in FIG. 6C. A user using access points configured to the system by the end user (e.g., home or office Wi-Fi) network accesses may experience the processes shown in FIG. 6D. In some implementations, access management processes may be implemented with different paths and/or with different, fewer, or more nodes. The processes may be implemented as computer executable instructions, which can be stored on computer-readable media, loaded onto one or more processors of one or more devices, and executed as one or more computer-implemented method. One example in which the network selection and responding to absence of internet connection or slow speed may be implemented differently is a system where the network selection is done completely automatically and does not directly involve the end user. For example, in cases where the ANAP system functions on the device are implemented without an explicit end user interface. In this case the system may move the mobile device away from an alternative access connection that does not meet the speed or other specified criteria for an acceptable connection. Also in this case, since there is no explicit way of "blacklisting" a specific connection to which the end user does not want to be automatically connected, the system may suspend for a specified time any connection efforts to any alternative access points in case the end user turns the alternative access radio system (Wi-Fi) radio off while the device is connected to the access point.

As communication needs of various wireless and mobile devices have grown, many of them have been equipped with more than one radio system. Each of the radio systems may be used to connect to one or more wireless networks based on the system protocols. Examples of such systems are a cellular radio system that may be utilizing a GSM or a CDMA standard for encoding the signal and a Wi-Fi system that utilizes a well-known IEEE 802.11 standard for communication. Another example would be a WiMAX system that is based on the IEEE standard 802.16. These are only a few examples. Other wireless communication systems may be used.

In a communication device that has multiple radio systems each of the radios may have different characteristics. For example, the cellular system may be designed to connect to cell towers that are further apart and use a higher power signal than the Wi-Fi radio system uses. Since the Wi-Fi standard is utilizing unlicensed spectrum, the power of the transmitter may be limited by regulation and consequently the distance over which the communication can effectively take place in is typically shorter than the distance in the case of a cellular connection.

Since the device is utilized for communication in different environments it will be most advantageous to utilize a particular radio system at different times. Differences in the desirability of different systems may be due to the signal quality, the efficiency of encoding as a result of the relative signal strengths or may pertain to the cost of using a particular radio system. The cost is typically dependent on various agreements that the owner of the device may have with various service providers.

The cost and other possible terms and conditions associated with establishing a connection with and using the data transfer services provided by any particular access point may vary based on agreements between the owners and operators of the access points and the wireless devices or based on offered and accepted access conditions. The incorporated '048 application discloses a mechanism that can be used to determine which radio and access point to use based on access conditions. This description presents at least a method for efficiently storing, accessing, changing, managing and structuring access conditions for determining the radio and access point to be used by the wireless device.

The access conditions comprise the terms and conditions for allowing access (TCsAA) established by the alternative network access provider (ANAP) and the terms and conditions for utilizing access (TCsUA) established by the party wishing to enable access for the wireless device. This party may be the cellular data service provider for the device, but it may also be a sponsor who may wish to enable access to a particular access point during a specific time at a location or may be enabling access only for the use of specific applications. The TCsAA may comprise price, time limits and/or other parameters pertaining to the access. The TCsUA may also include parameters for use, including time limits and/or conditions as to which applications need to be active and have control of the user interface or to which URLs or internet services the device is connected.

Some of the access conditions can get quite complex and in specific situations there may be several possible sponsors for each access point and there may be several alternative access points for the wireless device to choose from. Also the terms and conditions (TCs) may be changed at any time by any and all parties, such as the Alternative Network Access Provider and the various parties wishing to enable access (e.g., sponsors). At the same time the system wishes to store TCs for as many access points as possible in the local memory of the wireless device. As explained in the '048 application, this local storing makes it possible for the device to gain access to alternative networks associated with TCs even when it does not have any other access to the network to obtain TCs and passwords or access credentials. "TCs" is a short hand for terms and conditions, which also covers terms or conditions. TCs may include the TCsAA, TCsUA, and/or other terms and/or conditions.

To optimally solve the dilemma of complex, changing TCs and need for local storage of TCs for many access points, the TCs may be divided into two categories: complex and simple. The parameters of the simple TCs may be stored locally on the wireless device. These may include price, time limit, security parameters etc. At least some of the simple TCs may be in encrypted form (e.g., with a secured encryption key). In addition to the simple TCs for each access point an indication about whether complex TCs apply to the access point may be stored on the device for each point. This way the wireless device can gain access to the network through the access points utilizing the simple TCs and then, in case complex TCs apply, or the TCs have changed since they were last update on the device's local storage, the continuation of the connection, beyond a minimum determined by the simple TCs, may be determined based on the complex TCs.

In some implementations, TCs, simple and/or complex, may be rechecked depending on one or more factors. For example, TCs may be rechecked at the time of connection for complex transactions to get the latest quote and/or other information.

In optimizing the efficient use of local memory, security of the system, and/or other operational aspects of providing alternative network access, it may be beneficial that the device to access an alternative network has in local storage the TCs for access points that it is most likely to encounter. To do this the specific access points stored in a particular device are determined based on the location of the device when it connects to the network and contacts the server that manages the TCs for alternative network access. There are various ways to determine the set of access points:

For example, all access points in the immediate vicinity of the device can be downloaded first. The radius for immediate vicinity may be determined based on the available storage resources, available network speed for downloading, density of access points that provide access based on TCs in the vicinity of the device, historical usage patterns of access by the device, historical geographic location patterns of the device and by other parameters, including association of the device or its owner with particular access providers or sponsors of access.

Another example is that a larger "bubble" of access points and their TCs in the vicinity of the device can be downloaded at regular intervals, where the radius of the area considered to be in vicinity may be larger than the initial download. As used herein, a "bubble" refers to a geographical area of any shape. For example, a bubble can be an area that is substantially within X distance radius. Another bubble may be a substantial square, such as a two blocks by two blocks square.

A "bubble" of access points and their TCs may be downloaded in the vicinity of a location specified by the device user through a user interface. This could be in conjunction with future travel plans with a device that has only one radio system or for other reasons.

In order to efficiently utilize the storage resources the access points in the "bubble" may be "aged". In other words if a set of access points in a particular geographic area has been downloaded and the device has not been within that area during a specified historical time interval (i.e., the device has not detected and/or connected to the aged access point in the time interval), the access point information may be removed from the device to make room for new access point information.

In some implementations, in order to manage the downloading and uploading of information from the wireless device in accordance with the information needs of both the wireless device and the alternative network access provider other mechanisms of controlling the actions of the device and the server system may be used. For example it may be desirable to gather information about access points or functional characteristics of many possible network access providers. With possibly a large number (e.g., millions) of devices moving around across a wide geographic area there may be specific needs for additional information in some areas and an overabundance of uploaded test results and information from other areas. Similarly the wireless device may need some information only if it enters a specific area.

The mechanism to manage actions of the device and information uploads and downloads comprises of, for example, defining certain geographic area boundaries with their associated time interval boundaries and possibly boundaries of other parameters like signal strength, observed speed of network, specific access point with which the wireless device is associated or connected. Specific actions may then be associated with combinations of the boundaries and the ranges they represent. For example, it may be defined that if the device is within a certain defined geographic area during a determined period of time and is associated to a specific access point and the signal strength, or other connection parameter is within specified limits, then the device conducts certain scanning and measurement operations and communicates the results to the server system.

Another example of multi-parameter based control of device actions is selecting certain communication messages to the user interface based on locations or based on measured or scanned results that the device obtains during specific intervals and/or with specific frequency for a specified number of times. For example the device may be recording the number of times it captures the identification parameters and measures signal strength of specific access points during specific times. Time intervals may be associated with typical activities in the daily rhythm of the activities of the device owner. For example, observations may be gathered between 2 am and 5 am, between 9 am and 11 am during typical lunch time from 11 am to 2 pm and afternoon 2 pm to 5 pm and finally from 5 pm to 8 pm, etc. Observations may include other factors, such as days of the week, locations, and/or other examples. The access points observed with strong signal during these times, combined with the maximum signal value observed for these access points during any time of the day and other observations at various times, may likely be access points the wireless mobile device owner has or encounters in or near his or her home, office (e.g., lunch place) and evening gathering place. As the total number and frequency of observations exceeds a defined limit, the device may communicate with the user or with the server system to effectuate a communication to the user regarding these access points. For example, the user may be told that if he or she can obtain the password or other security credentials for utilizing one or more specific access points and enters them once into his or her wireless device, he or she may gain benefits in terms of speed of the connection, cost and/or battery life.

Key parameters in determining the access point and radio system to be used by a wireless device include price, signal quality and network speed that can be obtained through the various alternatives. In most systems the signal strength may be directly measured for one, some, or all access points even without any credentials for association and connecting. In the alternative network access system the signal quality metric, typically the signal strength or signal to noise ratio, may have a set threshold value that is determined to provide a good enough over the air communication link. For example, only access points that meet the threshold value will be included in consideration. The price and other TCs can be made available through the mechanism described above through the server system of alternative network access provider. The available speed may be determined through, for example, the following methods:

Once a device has connected to the network (e.g., the user of the device has entered a vicinity of an access point or hotspot) it may conduct a speed test 622, FIGS. 6C and 6D, for example by multithreaded downloading of specific data files from various network nodes and measuring the time required to download a specific amount of data. In order to determine whether the speed meets a specific minimum threshold or other characteristics, which may be defined in the TCsUA, the connection manager for alternative network access conducts a speed test at the beginning of each connection. In order to not interfere with potential actual use of data by the device, the speed test starts with observing the speed of the dataflow spurned by applications that may be active in the device at the time of the connection. If this, so called ambient speed, does not exceed the minimum threshold defined for acceptable speed, the system initiates the active speed test by downloading the files as described above. The results of the test may be stored in the device and may be communicated to the server.

The actual speed test conducted at the beginning of the connection is obviously the most current indication of a variable that may vary as other users may be utilizing the same access point. Its reliability may be improved by comparing it to previously conducted speed tests that may be stored on the device or on the system server. The local, immediate test may also be repeated at various intervals to improve its representation of the user experience over time.

These intervals may be determined based on the results of previously conducted tests and the relevance of the previous test may be weighted based on the time of day and day of the week and year in comparison to the time and day of the current usage occasion.

To save data usage and minimize deterioration of the user experience the speed test may be conducted a small number of times (e.g., once at the beginning of a connection establishment, once every so often, once before a connection change, etc.). To check for speed during the connection there are a few examples:

Give the user an opportunity to test the speed if he/she notices poor performance.

Work with speed critical application providers to get their applications (e.g., YouTube®, Netflix® etc.) to send ANAP a message if, for example, their buffering interrupts the video play.

Monitoring which applications are on top and if a video application is up a long time with no traffic, run another speed test.

At the time of connecting to an access point automatically, semi-automatically, or manually whether based on TCs or based on user provided password for the access point the system may conduct a check for internet access to determine the presence of a possible captive portal and/or some other access control gateway. The various example ways of handling example requirements of a possible captive portal are discussed later below. One possibility is that for whatever reason the wireless device may end up connected to a wireless access point but does not have access to the internet or to another network that was intended. In this case there are alternative courses of action depending on the parameters of the situation.

A speed test may indicate that there is no network or Internet connection 624, there is a slow speed connection 640, and there is a good speed and/or good quality connection 660.

No Internet 624: An example situation may be that there is no Internet access. The situation may be resolved in any way that results in gaining Internet access. In a situation where there is internet access through an alternative network, for example through a cellular data connection, the solution may be disconnecting from the access point and blocking it from being a target for another automatic re-connection attempt by the ANAP system. In this case it is of paramount importance that the end user of the device stays informed about what is going on and that the end user remains in control, especially if the end user is in the middle of using the device, possibly already working to resolve the issue manually. An example resolution may be, but is not limited to, as follows:

If screen is off 626: disconnect, block for a period (e.g., 15 minutes), show a temporary notification in a user interface about no network (internet) access (possibly subject to preference setting).

If screen is on 628 and access point is associated with TCs from alternative network access provider (as shown in FIG. 6C): disconnect, block for a period (e.g., 15 minutes), show a temporary notification in a user interface about no network (internet) access (subject to preference setting).

If screen is on and access point is added by the owner of device: show normal permanent notification.

If the user of the device is viewing information about the status of the network and access point is owner-added: show dialog asking the user if they want to stay connected or disconnect (As shown in FIG. 6D. Note that access points associated with TCs from alternative network access provider are always disconnected, so no need to ask.

Slow Connection 640: An example situation may be that there is a slow connection. The situation may be resolved in any way that results in an increase of connection speed, for example by disconnecting from a slow network in case there is another, higher speed network available. Again this can be done in a way that will not frustrate the device end user's use of the device and possible manual connection selection activities. An example resolution may be, but is not limited to, as follows:

If screen is off 652 and access point is associated with TCs from alternative network access provider and device has another (cellular 650) wireless network connection: disconnect, block for 15 minutes, show temporary notification (subject to preference setting).

If screen is on 657 and access point is downloaded and device has another (cellular 650) wireless network connection: show normal permanent in user interface about slow network (internet) access (subject to preference setting).

If access point is owner-added or device does not have another (cellular) wireless network connection: show temporary notification in user interface about slow network (internet) access as shown in 645 in FIG. 6D, subject to preference setting.

If the user of the device is viewing information about the status of the network and access point is associated with TCs from alternative network access provider and device has a cell connection: show dialog asking the user if they want to stay connected or disconnect.

Since the access conditions may be multi-part comprising TCsAA and TCsUA and may have several potential access points and their providers as well as several potential sponsors with different terms there is a need for clear algorithms for determining the actual TCs applied to a specific connection. There are two portions, in some implementations, for determining the final TCs and the price:

First step is to determine which one of the access points may be selected and which one of the sponsors gets to provide the access and get a possible recognition, in a message communicated to the end user of the device or any other form. The access points with good enough signal quality metric may be arranged in, for example, an array in order of descending or ascending "ask" price and for each the possible sponsors are arranged in the order of ascending or descending "bid" price for each access point. The combination with the highest ask price to the lowest bid over the ask price will be selected for step two. Any ask price dependent commission charged by the alternative network access system operator may be added to the ask price before making the determination.

In step two there may be two kinds of prices: the ask price and possibly a number of bid prices for the access. The final clearing price is determined using one of several possible algorithms:

In case of several bid prices the price may be determined to be the highest "losing" bid price. In other words the highest bidder gets the connection but the price charged for using it will be the "second price", the price of the next bid below the winning bid.

The clearing price may also be determined by taking a percentage of the spread between the ask and the bid price and adding that to the bid price. The percentage may depend on a number of factors including the number of bids, their range, the size of the spread, the total value of the transaction, the total value or some other parameter of the transactions and trade between the seller and the buyer.

Portions of, or the entire commission to the alternative network access provider system operator may also be calculated based on the clearing price or a portion of the spread or a portion of the difference between the bid or the ask price and the clearing price.

In some cases the TCs including the price may depend on specific attributes of the device and the device owner or end user, or on a relationship of the user to the access provider or owner of the access point. For example, an access provider may have agreed that wireless devices belonging to end users that have a separate, but related or "linked" relationship with access provider may utilize the access points free of charge. An instance of this may be when a wired broadband and cable TV service provider has a network of access points and included in the cable TV-home broadband service agreement is free use of the provider's Wi-Fi access points. In these situations the process of determining the clearing price and TCs is modified by using so called "linked accounts"

In some implementations, a linked account can be validated with the account provider on an as-needed basis, a different basis, and/or on a periodic schedule to ensure that the linked account is in good standing and/or has valid credentials (e.g., validating the linked account via the account provider).

During the process of arranging the ask and bid prices in accordance with the algorithm described above the alternative network access provider system checks for information about linked accounts based on the identity of the subscriber, user or owner, the identity of the wireless device, the access point and/or a database of linked account relationships. The modified price based on any detected linked account relationship will be used in the process of determining the winning bid and the clearing price. The example of free access to subscribers is just an example of a border case. Obviously the linked account mechanism may be used to handle any situations where the bid or the ask price may depend on any relationship between the end user of the device and the sponsor of the connectivity and the access provider.

The linked account relationships will be included in the TCsAA and TCsUA managed by the alternative network access provider's system.

In some cases the access to the internet or other networks of interest is controlled by an access control gateway that may require a challenge-response authentication or a password or just a simple response of accepting terms and conditions for using the access point as a part of the TCs and the process of gaining access to internet or another desirable network or asset. These access control gateways (e.g., 802.11 security, such as WEB, WPA, WPA2, etc.) are sometimes called captive portals since they "capture" the connection, often by redirecting the traffic until the appropriate response is received or posted to the specified URL.

A part of the alternative network access system (ANAPS) is a mechanism for facilitating the process of traversing these captive portals by offering the end user a tool to automate the interaction with them. There are some specific mechanisms the ANAPS uses to provide this automation:

By capturing the challenge presented by a captive portal and transmitting it to the server for analysis, quality control and determination of whether the access point protected by the captive portal should be included in the group of access points in the scope of ANAP the connection managers in wireless devices greatly facilitate and speed up the expansion of the network of included access points.

Together with the challenge the wireless devices transmit to the ANAPS they also provide the unique device ID and coordinates of the device location and other characteristic information, for example the captive portal "signature" for the ANAPS data base. The signature is a unique portion of information or content of the challenge (page) the captive portal presents. In cases where only partial information can be obtained, for example the location coordinates may have low accuracy rating, the ANAPS system stores the partial information and gradually improves its knowledge base of the access points, and their performance metrics, as other wireless devices subsequently come into contact with the access points.

Based on analysis of the challenges and the definition of the signatures of captive portal pages and the collected parameters about the access points, often combined with information obtained directly from the owners or managers of the access points (access providers) the ANAPS or the wireless device or the two working in concert, compose a response to the challenge. This response may be a static posting to the URL as requested by the challenge, but it may also contain dynamic elements and active programming language and executable instructions to the device. The response may further include passwords, digital certificates, detailed portions or hashes of the captive portal challenge or dynamically changing parameters from the challenge and even details of the circumstances that the wireless device may have measured or captured in the local environment of the access point.

Figure 6E:
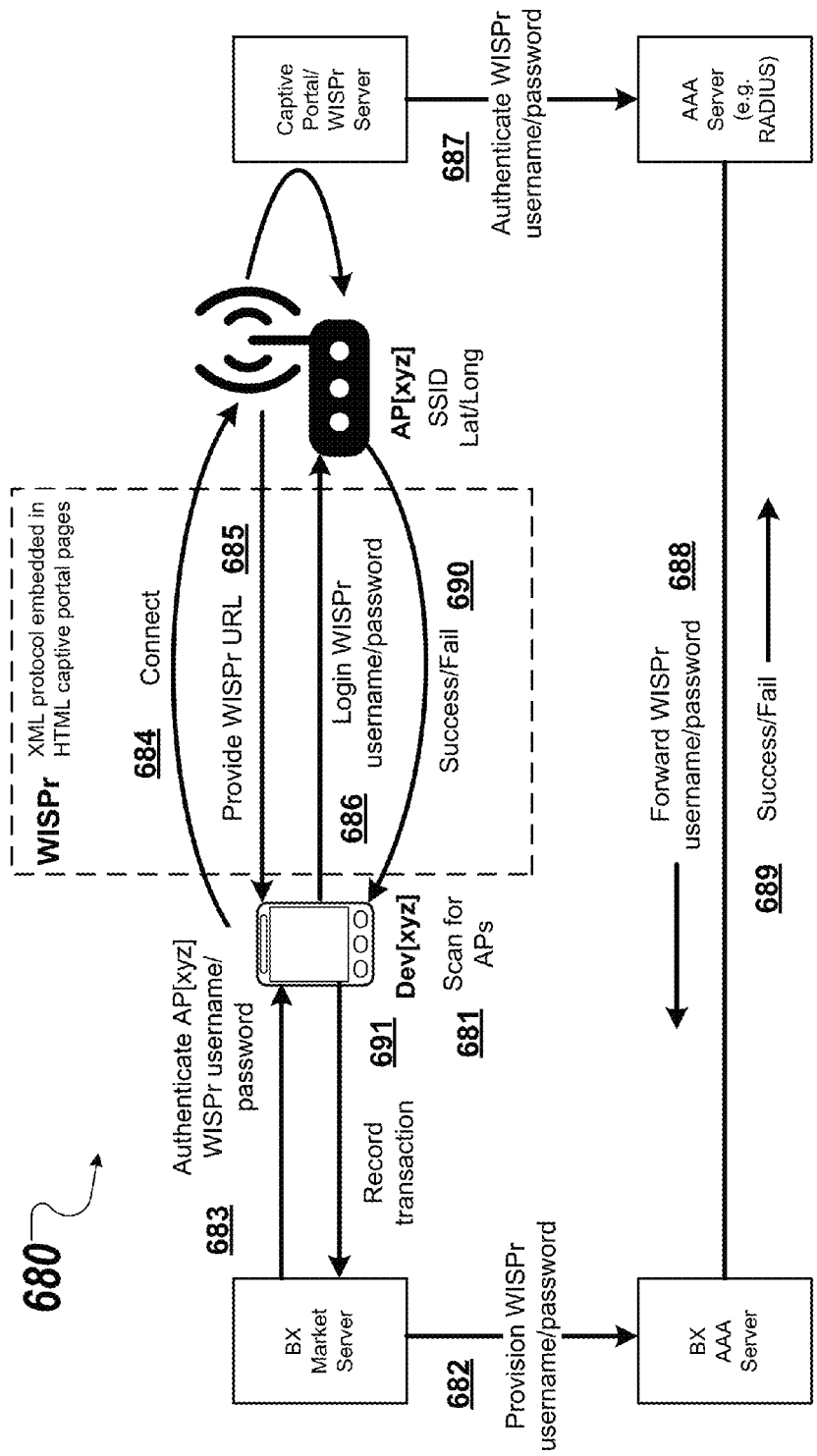
FIG. 6E shows an example process implementation of an example access control mechanism.

FIG. 6E shows an example process implementation of an example access control mechanism. Process 680 is an example implementation of an access control mechanism used in authenticating access to alternative network access points may utilize so called WISPr mechanism. The subject matter described herein is not limited to the example WISPr mechanism. The example mechanism a system that uses XML language to pass credentials between the mobile device and the access control server. The ANAP utilizes this mechanism by, for example, providing "just in time" credentials on its own server (referred to as an AAA server for discussion) specifically for one connection at a time and removes the credentials from the device so that it cannot re-connect without receiving a new authorization. The example process 680 may be implemented to include the following operation blocks.

681: Device [abc] with BX Market Function embedded into a third-party app scans for access points (APs) and sends list of APs it can see to BX Market Server, which sends back to the device an ordered list of which APs the device can connect. Assume that access point (AP) [xyz] is first on that list.

682: BX Market Server provisions WISPr credentials to BX AAA Server.

683: BX Market Server starts process to authorize Device [abc] on AP [xyz] and sends WISPr credentials to the device.

684: Device [abc] attempts to connect to AP [xyz].

685: Captive Portal/WISPr Server (via AP [xyz]) provides Device [abc] WISPr gateway URL

686: Device [abc] logs in using WISPr credentials, which are passed to Captive Portal/WISPr Server (via AP [xyz]).

687: Captive Portal/WISPr Server authenticates WISPr credentials by sending them to its AAA Server.

688: AAA Server forwards WISPr credentials to BX AAA Server, which checks these against the WISPr credentials sent to it in Step #2. This "closes the loop" and prevents unauthorized authentication attempts.

689: BX AAA Server returns success or failure from operation block 688.

690: The success or failure result is routed through AAA Server→Captive Portal/WISPr Server→AP [xyz] to Device [abc]. At this point, the WISPr credentials are deleted from the device. The device commences connection to the Internet.

691: Device [abc] records transaction and reports usage to BX Market Server.

In some implementations, process 680 may be implemented with different, fewer, or more operation blocks. Process 680 may be implemented as computer executable instructions, which can be stored on a medium, loaded onto one or more processors of one or more computing devices, and executed as a computer-implemented method.

The response for each challenge of each captive portal is stored either on the servers of ANAPS or in the memory of the wireless device and, possibly only after explicit request for and authorization of the end user, will be used by the wireless device to post the appropriate response to the challenge. Based on the stored response and the executable instructions included in it the device creates the "magic incantation" that will fulfill the end user's intent in responding or the access sponsors intent in enabling the connection.

The methods and mechanisms used by the ANAPS system (including the connection manager on the wireless device) to respond to the challenge may include traversing and analyzing HTML or XML language, utilizing so called Wireless Internet Service Provider roaming (WISPr) protocol or the IEEE 802.11x or 802.11u standard and exchanging information in accordance with the second generation hotspot or hotspot 2.0 or the Passpoint authentication and authorization mechanisms or other similar mechanisms for authentication and authorization.

The mechanisms of two way communication between the ANAPS server and the connection manager on the wireless device include using protocols such as JSON (JavaScript object notation), SSL, PKI and shared key encryption mechanisms, email and other well-known communication protocols that enable passing information and actively alerting the other end of the communication link to requesting information and updates and may be based on actions or observations initiated or made by the connection manager or by the server system.

For example, one or more communication protocols (e.g., Email) may use for communication from the server to the user about registration (e.g., password change verification and notification). In some implementations, the connection manager may communicate with the server using one or more communication protocols.

Figure 7:
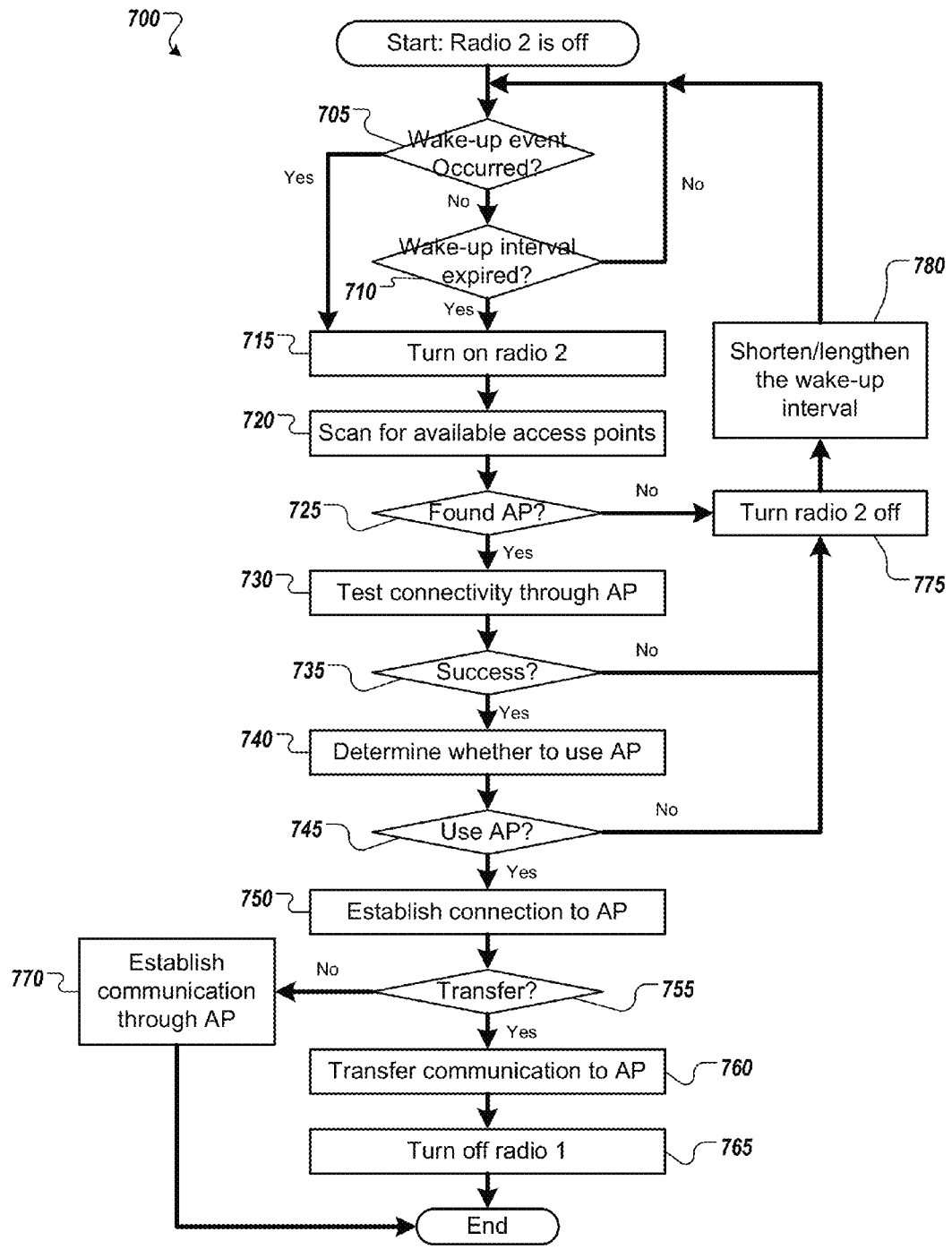
FIG. 7 shows an example process for managing radios.

FIG. 7 shows an example process. The process may be implemented to manage a radio of a device. This example is illustrated with two radios (e.g., radios 1 and 2). However, an implementation may include any number of radios. When radio 1 is on and radio 2 is off, process 700 may be used to manage the radios (e.g., manage the on/off stages of the radios) to, for example, minimize power consumption. Process 700 starts with decision block 705 being made to determine if a wake-up event has occurred. A wake up event may be triggered, for example, if a specific application is being executed, the throughput of radio 1 is above a high threshold or below a low threshold, the quality of an existing connection with radio 1 has deteriorated (e.g., a low signal to noise ratio), the location of the device has changed, etc. If a wake-up event has occurred, process 700 flows to block 715 where radio 2 is turned on. If a wake-up event has not occurred, determine if a wake-up interval has expired at decision block 710. When the wake-up interval has expired, turn on radio 2 at block 715. If not, process 700 loops back to decision block 705.

After radio 2 is turned on, scan for available connectivity access (e.g., available access points) at block 720. If found at decision block 725, perform a connectivity test at block 730. If no access point is found, turn off radio 2 and depending on the history and other parameters adjust the wake-up interval. Just because an access point is available does not guarantee that the access point can connect to a desire source (e.g., on the Internet). The connectivity test may be a simple "ping" command to a known destination, an access to a known website, or by any manner to establish that an end-to-end connection is likely to succeed, as determined in decision block 735, using the access point found at block 720.

At block 740, a determination (e.g., comparison) is performed to determine whether to use the found access point. The comparison may be based on one or more access conditions (e.g., costs, capacity, speed, etc.) as described above. If the determination is positive at decision block 745, establish a connection with the found access point at block 750. If the new connection using radio 2 is made to replace an existing connection (e.g., using radio 1), as shown in decision block 755, then the communication using radio 1 is to be transferred at block 760. After transferred, radio 1 may be turned off or put in a power-save mode at bock 765 to conserve power. If the existing communication using radio 1 is not to be transferred, the connection using radio 2 is used in parallel with the existing connection using radio 1, for example, to speed up the communication on radio 1 or for new communication. When a communication on any of the radio has come to an end, that radio may be turned off or put on a power-save mode. Process 700 flows back to the beginning.

If the result at decision block 725, 735, or 745 is "No," process 700 flows to block 775, where radio 2 is turned off or put on a power-save mode. Then the wake-up interval may be lengthened or shortened, at block 780, as described above. Process 700 flows back to the beginning.

In some examples, process 700 may be implemented with different, fewer, or more blocks. Process 700 may be implemented as computer executable instructions, which can be stored on a medium, loaded onto one or more processors of one or more computing devices and mobile devices, and executed as a computer-implemented method.

Figure 8:
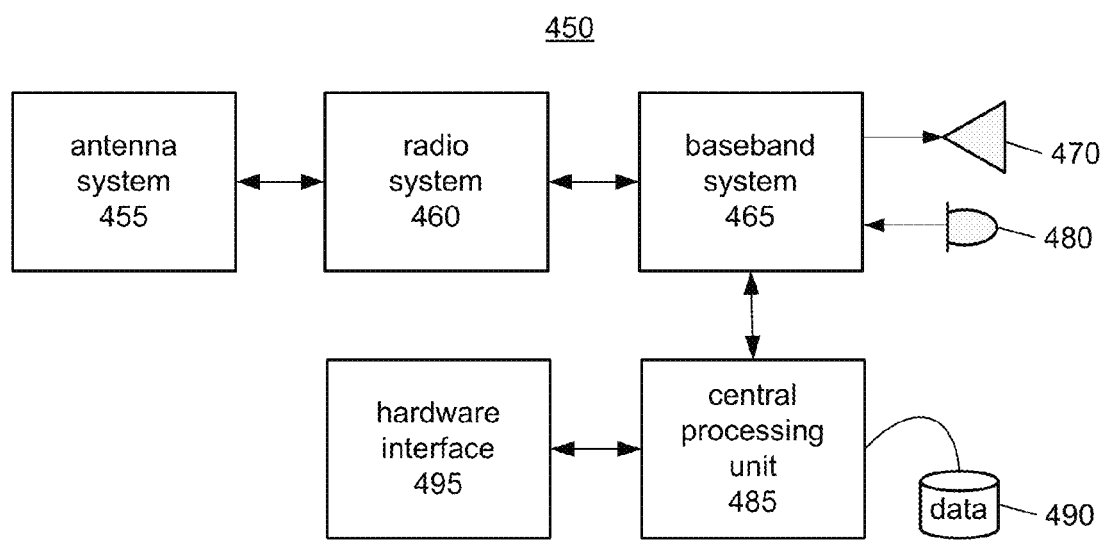
FIG. 8 a block diagram illustrating an example wireless communication device.

FIG. 8 a block diagram illustrating an example wireless communication device 450 that may be used in connection with various embodiments described herein. For example, the wireless communication device 450 may be configured and/or implemented as an access point, a mobile device with a configuration different that shown in FIG. 1E, or a device or component used in an alternative network access provider system. However, other wireless communication devices and/or architectures may also be used, as will be clear to those skilled in the art.

In the illustrated embodiment, wireless communication device 450 comprises an antenna system 455, a radio system 460, a baseband system 465, a speaker 470, a microphone 480, a central processing unit ("CPU") 485, a data storage area 490, and a hardware interface 495. In the wireless communication device 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies and/or using different wireless communication protocols. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 may be configured to execute instructions (i.e., computer programs or software) that can be stored in the data storage area 490. Computer programs can also be received from the baseband processor 465 and stored in the data storage area 490 or executed upon receipt. Such computer programs, when executed, enable the wireless communication device 450 to perform the various functions of the present invention as previously described. For example, data storage area 490 may include various software modules (not shown) described with respect to one or more of FIGS. 3-7.

Non-transitory media may be used to provide executable instructions (e.g., software and computer programs) to the wireless communication device 450 for execution by the central processing unit 485. An example of a non-transitory medium is data storage 490. Communication device 450 may obtain executable instructions via microphone 480 (via the baseband system 465), antenna system 455 (also via the baseband system 465), and hardware interface 495.

The central processing unit 485 is configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a Universal Serial Bus ("USB") port, a Bluetooth or infrared wireless unit, or any of a variety of wired or wireless access mechanisms. Examples of hardware that may be linked with the device 450 include data storage devices, computing devices, headphones, microphones, and the like.

Figure 9:
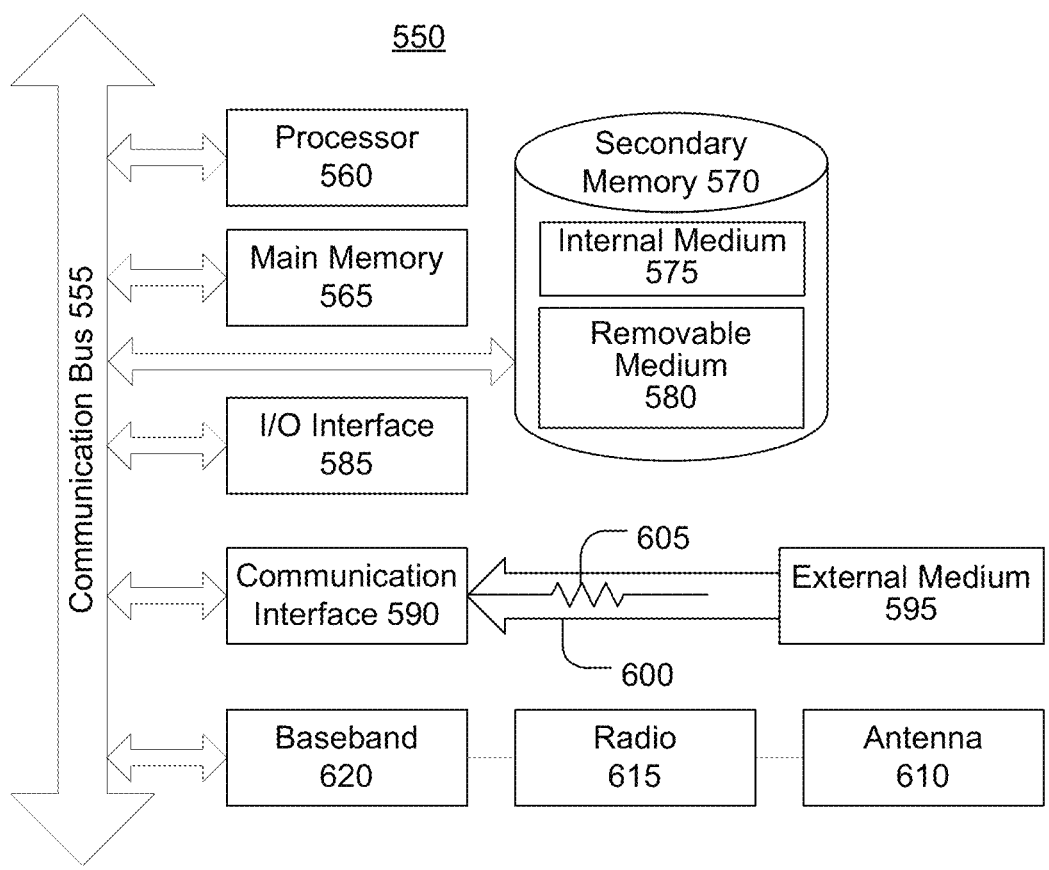
FIG. 9 is a block diagram illustrating an example wired or wireless processor enabled device that may be used in connection with various embodiments described herein.

FIG. 9 is a block diagram illustrating an example wired or wireless system 550 that may be used in connection with various embodiments described herein. For example the system 550 may be configured and/or implemented as an access point. Another apparatus having similar components as system 550 may be implemented as a mobile device (e.g., one with a configuration different that that shown in FIG. 1E). Another apparatus having similar components as system 550 may be implemented as a device or component used in an alternative network access provider system. The system 550 and the like can be implemented as a computer, server, laptop computer, smart phone, tablet computer, or any other processor enabled device that is capable of wired and/or wireless communication. Other computer systems and/or architectures may be also used, as will be clear to those skilled in the art.

The system 550 may include one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 may be connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, Advanced Technology Attachment ("ATA"), Serial ATA ("SATA"), or standards promulgated by the Institute of Electrical and Electronics Engineers ("IEEE") including IEEE 488 general-purpose interface bus ("GPIB"), IEEE 696/S-100, and the like.

System 550 may include a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire connection, Universal Serial Bus ("USB") connection(s), just to name a few.

Communication interface 590 may implement one or more protocols or standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 may be provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any transitory or non-transitory computer readable media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These transitory and non-transitory computer readable media are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 may be configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Figure 10:
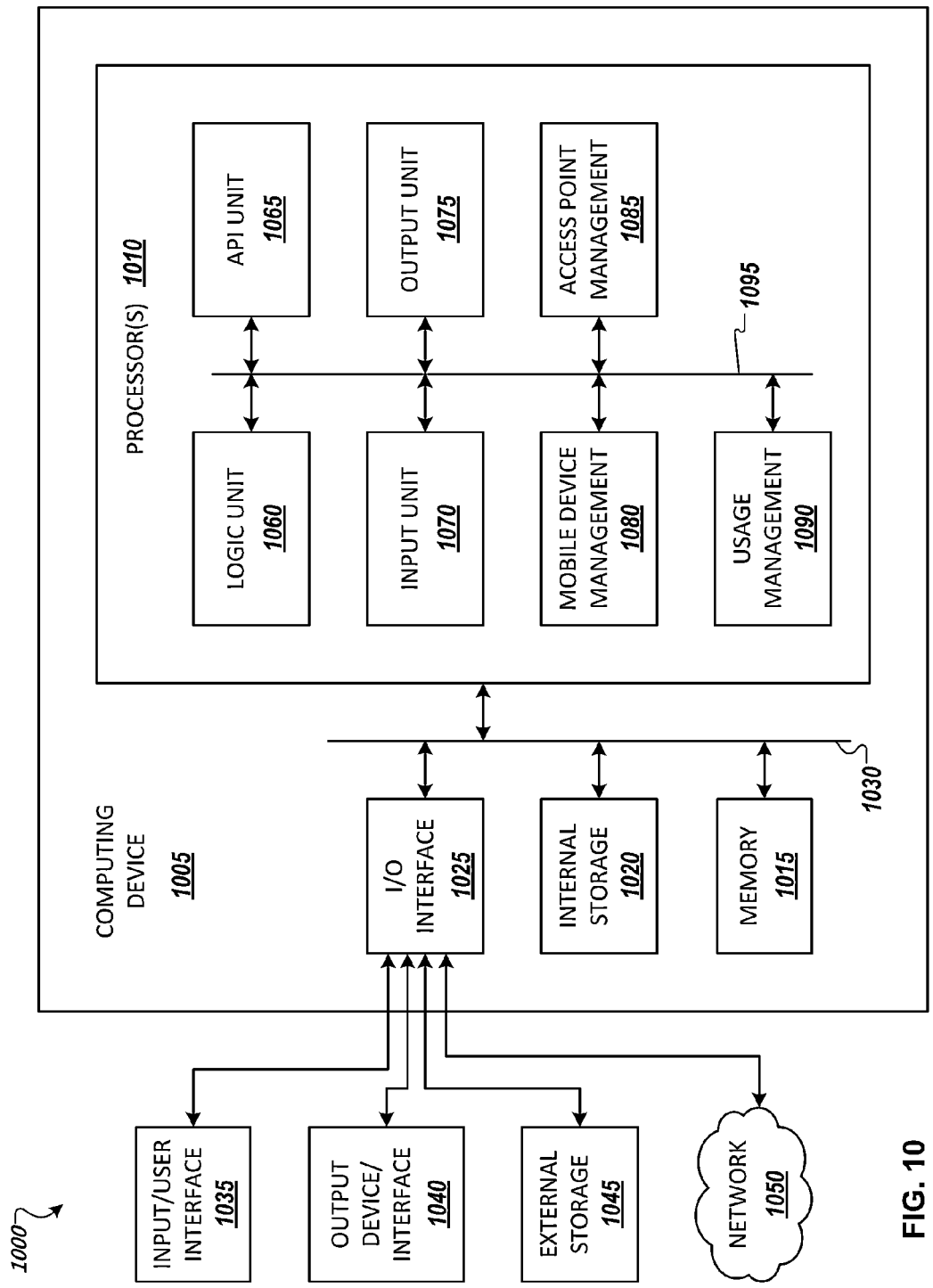
FIG. 10 is a functional block diagram of an example computing environment with an example computing device suitable for use in some example implementations.

FIG. 10 is an example computing environment with an example computing device suitable for use in some example implementations (e.g., a mobile device, access point, a device in an ANAP system). Computing device 1005 in computing environment 1000 can include one or more processing units, cores, or processors 1010, memory 1015 (e.g., RAM, ROM, and/or the like), internal storage 1020 (e.g., magnetic, optical, solid state storage, and/or organic), and/or I/O interface 1025, any of which can be coupled on a communication mechanism or bus 1030 for communicating information or embedded in the computing device 1005.

Computing device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computing device 1005. In other example implementations, other computing devices may function as or provide the functions of input/user interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions coupled to one or more processors, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, mobile device management unit 1080, access point management unit 1085, usage management unit 1090, and inter-unit communication mechanism 1095 for the different units to communicate with each other, with the OS, and with other applications (not shown). For example, mobile device management unit 1080, access point management unit 1085, and usage management unit 1090 may implement one or more processes shown in FIGS. 3-7. The described units and elements can be varied in design, function, configuration, or implementation and are not limited to the descriptions provided.

In some example implementations, when information or an execution instruction is received by API unit 1065, it may be communicated to one or more other units (e.g., logic unit 1060, input unit 1070, output unit 1075, mobile device management unit 1080, access point management unit 1085, and usage management unit 1090). In an ANAP implementation, for example, input unit 1170 may receive location information of a mobile device and pass the information to mobile device management unit 1080. Access point management unit 1085 may determine one or more access points and provide information about these access points to the mobile device via output unit 1175 (e.g., communicated to the mobile device using a radio or through another radio communication device connected to network 1150). The mobile device and/or an access point may provide usage data that are managed by the usage management unit 1190, which may provide billing and/or payment information to the owners and/or operators the mobile device and access points.

In some instances, logic unit 1060 may be configured to control the information flow among the units and direct the services provided by API unit 1065, input unit 1070, output unit 1075, mobile device management unit 1080, access point management unit 1085, and usage management unit 1090 in some example implementations described above. For example, the flow of one or more processes or implementations may be controlled by logic unit 1060 alone or in conjunction with API unit 1065.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

The following table provides definitions of acronyms:

| Acronym | Definition |
| --- | --- |
| 1X-EVDO | Evolution-Data Optimized |
| 2G | Second-generation wireless standards and protocols (including 2.5G protocols) |
| 3G | Third-generation wireless standards and protocols |
| 4G | Fourth generation wireless standards and protocols |

-continued

| Acronym | Definition |
| --- | --- |
| API | Application programming interface |
| ASIC | Application specific integrated circuit |
| BSSID | Basic service set identification |
| CDMA | Code division multiple access |
| CDMA2000 | Family of wireless standards and protocols, which use CDMA channel access, to send voice, data, and signaling data between mobile phones and cell sites |
| CD-ROM | Compact Disc Read-only memory |
| DSP | Digital signal processor |
| EAP | Extended Authentication Protocol |
| EDGE | Enhanced Data Rates for GSM Evolution |
| EPROM | Erasable programmable read only memory |
| EEPROM | Electrically Erasable Programmable Read-Only Memory |
| FPGA | Field programmable gate array |
| GPRS | General packet radio service |
| GPS | Global Positioning System |
| GSM | Global System for Mobile Communication |
| HSPA | High Speed Packet Access |
| iDEN | Integrated Digital Enhanced Network |
| IEEE | Institute of Electrical and Electronics Engineers |
| IMS | IP Multimedia Subsystem |
| IPTV | Internet Protocol television |
| ISP | Internet service provider |
| LTE | Long Term Evolution, marketed as 4G LTE, is a standard for wireless communication of high-speed data for mobile phones and data terminals |
| M2M | Mobile to mobile |
| MAC | Media Access Control |
| P25-LMR | Land mobile radio |
| PKI | Public key infrastructure |
| RADIUS | Remote Authentication Dial In User Service |
| RAM | Random-access memory |
| ROM | Read-only memory |
| SOC | System on chip |
| SSID | Service set identifier |
| TDMA | Time division multiple access |
| Ts&Cs | Terms and conditions |
| UMTS | Universal Mobile Telecommunications System |
| VoIP | Voice over Internet Protocol |
| WAN | Wide Area Network |
| WCDMA | Wideband Code Division Multiple Access |
| Wi-Fi | The family of 802.11 standards from IEEE and the like |
| WiMAX | Worldwide Interoperability for Microwave Access |
| WISPr | Wireless Internet Provider roaming |
| WLAN | Wireless local area network |

What is claimed is:

1. A method for managing alternative network access implemented by a mobile device, the method comprising:

downloading, from a remote server, information for one or more access points within a geographical vicinity of a location, wherein the information comprises simple terms and conditions (TCs), wherein the simple TCs comprise one or more parameters including a price that is acceptable under all circumstances until the mobile device can connect to the remote server to download complex TCs, and wherein each of the complex TCs comprises a plurality of parameters, which are greater in number than the one or more parameters in the simple TCs, and wherein the plurality of parameters in each of the complex TCs comprise a price for utilizing an access point;

determining to establish a connection with at least one of the one or more access points, based on at least the one or more parameters in the simple TCs;

based on the determination, establishing the connection with the at least one access point, in accordance with the simple TCs, for at least a minimum time period determined from the simple TCs; and, subsequent to the establishment of the connection and during the minimum time period, downloading the complex TCs from the remote server over the connection with the at least one access point, and determining whether to continue the connection with the at least one access point, beyond the minimum time period, based on the plurality of parameters in the downloaded complex TCs.

2. The method of claim 1, further comprising, automatically:
scanning for access points within a vicinity of a current location of the mobile device;
identifying at least one access point within the vicinity of the current location of the mobile device at a current time; and
notifying an alternative network access provider service that the identified at least one access point is available at that current location at that current time.

3. The method of claim 1, further comprising removing information for at least one of the one or more access points after the mobile device has not detected or connected to that at least one access point in a certain time interval.

4. The method of claim 1, wherein the mobile device comprises a first radio and a second radio, and wherein establishing the connection with the at least one access point comprises:
establishing the connection with the at least one access point using the first radio; and
terminating a connection with another access point using the second radio.

5. The method of claim 1, further comprising:
detecting a change in the location to a new location; and
downloading new information for one or more additional access points within a geographical vicinity of the new location, wherein the new information comprises, for each of the one or more additional access points, simple TCs for the access point and an indication of whether complex TCs apply to the access point, wherein the simple TCs comprise one or more parameters including price information.

6. The method of claim 1, wherein the location is a current location of the mobile device.

7. The method of claim 1, wherein the location is a location, received from a user interface of the mobile device, that is not a current location of the mobile device.

8. A non-transitory computer readable medium having stored therein computer executable instructions for:
downloading, from a remote server, information for one or more access points within a geographical vicinity of a location, wherein the information comprises simple terms and conditions (TCs), wherein the simple TCs comprise one or more parameters including a price that is acceptable under all circumstances until the mobile device can connect to the remote server to download complex TCs, and wherein each of the complex TCs comprises a plurality of parameters which are greater in number than the one or more parameters in the simple TCs, and wherein the plurality of parameters in each of the complex TCs comprise a price for utilizing an access point;
determining to establish a connection with at least one of the one or more access points, based on at least the simple TCs;
based on the determination, establishing the connection with the at least one access point, in accordance with the simple TCs, for at least a minimum time period determined from the simple TCs; and,
subsequent to the establishment of the connection and during the minimum time period, downloading the complex TCs from the remote server over the connection with the at least one access point, and determining whether to continue the connection with the at least one access point, beyond the minimum time period, based on the plurality of parameters in the downloaded complex TCs.

9. The computer readable medium of claim 8, having stored therein further computer executable instructions for, automatically:
scanning for access points within a vicinity of a current location of the mobile device;
identifying at least one access point within the vicinity of the current location of the mobile device at a current time; and
notifying an alternative network access provider service that the identified at least one access point is available at that current location at that current time.

10. The computer readable medium of claim 8, having stored therein further computer executable instructions for removing information for at least one of the one or more access points after the mobile device has not detected or connected to that at least one access point in a certain time interval.

11. The computer readable medium of claim 8, wherein the mobile device comprises a first radio and a second radio, and wherein establishing the connection with the at least one access point comprises:
establishing the connection with the at least one access point using the first radio; and
terminating a connection with another access point using the second radio.

12. The computer readable medium of claim 8, having stored therein further computer executable instructions for:
detecting a change in the location to a new location; and
downloading new information for one or more additional access points within a geographical vicinity of the new location, wherein the new information comprises, for each of the one or more additional access points, simple TCs for the access point and an indication of whether complex TCs apply to the access point, wherein the simple TCs comprise one or more parameters including price information.

13. The computer readable medium of claim 8, wherein the location is a current location of the mobile device.

14. A mobile device comprising storage and a processor configured to perform:
downloading, from a remote server, information for one or more access points within a geographical vicinity of a location, wherein the information comprises simple terms and conditions (TCs), wherein the simple TCs comprise one or more parameters including a price that is acceptable under all circumstances until the mobile device can connect to the remote server to download complex TCs, and wherein each of the complex TCs comprises a plurality of parameters which are greater in number than the one or more parameters in the simple TCs, and wherein the plurality of parameters in each of the complex TCs comprise a price for utilizing an access point;
determining to establish a connection with at least one of the one or more access points, based on at least the simple TCs;
based on the determination, establishing the connection with the at least one access point, in accordance with the simple TCs, for at least a minimum time period determined from the simple TCs; and, subsequent to the establishment of the connection and during the minimum time period, downloading the complex TCs from the remote server over the connection with the at least one access point, and determining whether to continue the connection with the at least one access point, beyond the minimum time period, based on the plurality of parameters in the downloaded complex TCs.

15. The mobile device of claim 14, wherein the processor is further configured to perform:
scanning for access points within a vicinity of a current location of the mobile device;
identifying at least one access point within the vicinity of the current location of the mobile device at a current time; and
notifying an alternative network access provider service that the identified at least one access point is available at that current location at that current time.

16. The mobile device of claim 14, wherein the processor is further configured to perform removing information for at least one of the one or more access points after the mobile device has not detected or connected to that at least one access point in a certain time interval.

17. The mobile device of claim 14, wherein the mobile device comprises a first radio and a second radio, and wherein establishing the connection with the at least one access point comprises:
establishing the connection with the at least one access point using the first radio; and
terminating a connection with another access point using the second radio.

18. The mobile device of claim 14, wherein the processor is further configured to perform:
detecting a change in the location to a new location; and
downloading new information for one or more additional access points within a geographical vicinity of the new location, wherein the new information comprises, for each of the one or more additional access points, simple TCs for the access point and an indication of whether complex TCs apply to the access point, wherein the simple TCs comprise one or more parameters including price information.

19. The mobile device of claim 14, wherein the location is a current location of the mobile device.

20. The mobile device of claim 14, wherein the location is a location, received from a user interface of the mobile device, that is not a current location of the mobile device.

21. The method of claim 1, wherein the price included in the plurality of parameters of the complex TCs is different than the price included in the one or more parameters of the simple TCs, wherein the determination to establish the connection with the at least one access point is based, at least in part, on the price included in the one or more parameters of the simple TCs, and wherein the determination whether to continue the connection with the at least one access point, beyond the minimum time period, is based, at least in part, on the price included in the plurality of parameters of the complex TCs for the at least one access point.

22. A method for managing alternative network access implemented by a remote server, the method comprising:
sending information to a mobile device for one or more access points within a geographical vicinity of a location, wherein the information comprises simple terms and conditions (TCs), wherein the simple TCs comprise one or more parameters including a price that is acceptable under all circumstances until complex TCs are sent to the mobile device, wherein each of the complex TCs comprises a plurality of parameters which are greater in number than the one or more parameters in the simple TCs, and wherein the plurality of parameters in each of the complex TCs comprise a price for utilizing an access point; and,
subsequently, when a request is received from the mobile device via a connection through at least one access point during a minimum time period determined by the simple TCs, sending the complex TCs for the at least one access point to the mobile device over the connection through the at least one access point.

23. A remote server comprising storage and a processor configured to perform:
sending information to a mobile device for one or more access points within a geographical vicinity of a location, wherein the information comprises simple terms and conditions (TCs), wherein the simple TCs comprise one or more parameters including a price that is acceptable under all circumstances until complex TCs are sent to the mobile device, wherein each of the complex TCs comprises a plurality of parameters which are greater in number than the one or more parameters in the simple TCs, and wherein the plurality of parameters in each of the complex TCs comprise a price for utilizing an access point; and,
subsequently, when a request is received from the mobile device via a connection through at least one access point during a minimum time period determined by the simple TCs, sending the complex TCs for the at least one access point to the mobile device over the connection through the at least one access point.

24. The method of claim 22, further comprising determining whether to continue the connection with the at least one access point beyond the minimum time period.

25. The remote server of claim 23, further comprising determining whether to continue the connection with the at least one access point beyond the minimum time period.

* * * * *